(12) United States Patent
Alverson et al.

(10) Patent No.: US 12,244,489 B2
(45) Date of Patent: Mar. 4, 2025

(54) SYSTEM AND METHOD FOR PERFORMING ON-THE-FLY REDUCTION IN A NETWORK

(71) Applicant: Hewlett Packard Enterprise Development LP, Houston, TX (US)

(72) Inventors: Robert Alverson, Seattle, WA (US); Andrew S. Kopser, Seattle, WA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 62 days.

(21) Appl. No.: 17/594,789

(22) PCT Filed: Mar. 23, 2020

(86) PCT No.: PCT/US2020/024269
§ 371 (c)(1),
(2) Date: Oct. 29, 2021

(87) PCT Pub. No.: WO2020/236288
PCT Pub. Date: Nov. 26, 2020

(65) Prior Publication Data
US 2022/0191128 A1    Jun. 16, 2022

Related U.S. Application Data

(60) Provisional application No. 62/852,273, filed on May 23, 2019, provisional application No. 62/852,203, (Continued)

(51) Int. Cl.
*H04L 45/028* (2022.01)
*G06F 9/50* (2006.01)
(Continued)

(52) U.S. Cl.
CPC .............. *H04L 45/28* (2013.01); *G06F 9/505* (2013.01); *G06F 9/546* (2013.01);
(Continued)

(58) Field of Classification Search
None
See application file for complete search history.

(56) References Cited

U.S. PATENT DOCUMENTS 4,807,118 A    2/1989  Lin et al.
5,138,615 A    8/1992  Lamport et al.
(Continued)

FOREIGN PATENT DOCUMENTS

CN    101729609 A    6/2010
CN    102932203 A    2/2013
(Continued)

OTHER PUBLICATIONS

Awerbuch, B., et al.; "An On-Demand Secure Routing Protocol Resilient to Byzantine Failures"; Sep. 2002; 10 pages.
(Continued)

*Primary Examiner* — Steve R Young
(74) *Attorney, Agent, or Firm* — Yao Legal Services, Inc.

(57) ABSTRACT

A switch capable of on-the-fly reduction in a network is provided. The switch is equipped with a reduction engine that can be dynamically configured to perform on-the-fly reduction. As a result, the network can facilitate an efficient and scalable environment for high performance computing.

21 Claims, 12 Drawing Sheets

Related U.S. Application Data filed on May 23, 2019, provisional application No. 62/852,289, filed on May 23, 2019.

(51) Int. Cl.

| | | |
|---|---|---|
| G06F 9/54 | (2006.01) | |
| G06F 12/0862 | (2016.01) | |
| G06F 12/1036 | (2016.01) | |
| G06F 12/1045 | (2016.01) | |
| G06F 13/14 | (2006.01) | |
| G06F 13/16 | (2006.01) | |
| G06F 13/28 | (2006.01) | |
| G06F 13/38 | (2006.01) | |
| G06F 13/40 | (2006.01) | |
| G06F 13/42 | (2006.01) | |
| G06F 15/173 | (2006.01) | |
| H04L 1/00 | (2006.01) | |
| H04L 43/0876 | (2022.01) | |
| H04L 43/10 | (2022.01) | |
| H04L 45/00 | (2022.01) | |
| H04L 45/02 | (2022.01) | |
| H04L 45/021 | (2022.01) | |
| H04L 45/12 | (2022.01) | |
| H04L 45/122 | (2022.01) | |
| H04L 45/125 | (2022.01) | |
| H04L 45/16 | (2022.01) | |
| H04L 45/24 | (2022.01) | |
| H04L 45/28 | (2022.01) | |
| H04L 45/42 | (2022.01) | |
| H04L 45/745 | (2022.01) | |
| H04L 45/7453 | (2022.01) | |
| H04L 47/10 | (2022.01) | |
| H04L 47/11 | (2022.01) | |
| H04L 47/12 | (2022.01) | |
| H04L 47/122 | (2022.01) | |
| H04L 47/20 | (2022.01) | |
| H04L 47/22 | (2022.01) | |
| H04L 47/24 | (2022.01) | |
| H04L 47/2441 | (2022.01) | |
| H04L 47/2466 | (2022.01) | |
| H04L 47/2483 | (2022.01) | |
| H04L 47/30 | (2022.01) | |
| H04L 47/32 | (2022.01) | |
| H04L 47/34 | (2022.01) | |
| H04L 47/52 | (2022.01) | |
| H04L 47/62 | (2022.01) | |
| H04L 47/625 | (2022.01) | |
| H04L 47/6275 | (2022.01) | |
| H04L 47/629 | (2022.01) | |
| H04L 47/76 | (2022.01) | |
| H04L 47/762 | (2022.01) | |
| H04L 47/78 | (2022.01) | |
| H04L 47/80 | (2022.01) | |
| H04L 49/00 | (2022.01) | |
| H04L 49/101 | (2022.01) | |
| H04L 49/15 | (2022.01) | |
| H04L 49/90 | (2022.01) | |
| H04L 49/9005 | (2022.01) | |
| H04L 49/9047 | (2022.01) | |
| H04L 67/1097 | (2022.01) | |
| H04L 69/22 | (2022.01) | |
| H04L 69/40 | (2022.01) | |
| H04L 69/28 | (2022.01) | |

(52) U.S. Cl.
CPC ...... *G06F 12/0862* (2013.01); *G06F 12/1036* (2013.01); *G06F 12/1063* (2013.01); *G06F 13/14* (2013.01); *G06F 13/16* (2013.01); *G06F 13/1642* (2013.01); *G06F 13/1673* (2013.01); *G06F 13/1689* (2013.01); *G06F 13/28* (2013.01); *G06F 13/385* (2013.01); *G06F 13/4022* (2013.01); *G06F 13/4068* (2013.01); *G06F 13/4221* (2013.01); *G06F 15/17331* (2013.01); *H04L 1/0083* (2013.01); *H04L 43/0876* (2013.01); *H04L 43/10* (2013.01); *H04L 45/02* (2013.01); *H04L 45/021* (2013.01); *H04L 45/028* (2013.01); *H04L 45/122* (2013.01); *H04L 45/123* (2013.01); *H04L 45/125* (2013.01); *H04L 45/16* (2013.01); *H04L 45/20* (2013.01); *H04L 45/22* (2013.01); *H04L 45/24* (2013.01); *H04L 45/38* (2013.01); *H04L 45/42* (2013.01); *H04L 45/46* (2013.01); *H04L 45/566* (2013.01); *H04L 45/70* (2013.01); *H04L 45/745* (2013.01); *H04L 45/7453* (2013.01); *H04L 47/11* (2013.01); *H04L 47/12* (2013.01); *H04L 47/122* (2013.01); *H04L 47/18* (2013.01); *H04L 47/20* (2013.01); *H04L 47/22* (2013.01); *H04L 47/24* (2013.01); *H04L 47/2441* (2013.01); *H04L 47/2466* (2013.01); *H04L 47/2483* (2013.01); *H04L 47/30* (2013.01); *H04L 47/32* (2013.01); *H04L 47/323* (2013.01); *H04L 47/34* (2013.01); *H04L 47/39* (2013.01); *H04L 47/52* (2013.01); *H04L 47/621* (2013.01); *H04L 47/6235* (2013.01); *H04L 47/626* (2013.01); *H04L 47/6275* (2013.01); *H04L 47/629* (2013.01); *H04L 47/76* (2013.01); *H04L 47/762* (2013.01); *H04L 47/781* (2013.01); *H04L 47/80* (2013.01); *H04L 49/101* (2013.01); *H04L 49/15* (2013.01); *H04L 49/30* (2013.01); *H04L 49/3009* (2013.01); *H04L 49/3018* (2013.01); *H04L 49/3027* (2013.01); *H04L 49/90* (2013.01); *H04L 49/9005* (2013.01); *H04L 49/9021* (2013.01); *H04L 49/9036* (2013.01); *H04L 49/9047* (2013.01); *H04L 67/1097* (2013.01); *H04L 69/22* (2013.01); *H04L 69/40* (2013.01); *G06F 2212/50* (2013.01); *G06F 2213/0026* (2013.01); *G06F 2213/3808* (2013.01); *H04L 69/28* (2013.01)

(56) References Cited

U.S. PATENT DOCUMENTS

| | | |
|---|---|---|
| 5,457,687 A | 10/1995 | Newman |
| 5,937,436 A | 8/1999 | Watkins |
| 5,960,178 A | 9/1999 | Cochinwala et al. |
| 5,970,232 A | 10/1999 | Passint et al. |
| 5,983,332 A | 11/1999 | Watkins |
| 6,112,265 A | 8/2000 | Harriman et al. |
| 6,230,252 B1 | 5/2001 | Passint et al. |
| 6,246,682 B1 | 6/2001 | Roy et al. |
| 6,493,347 B2 | 12/2002 | Sindhu et al. |
| 6,545,981 B1 | 4/2003 | Garcia et al. |
| 6,633,580 B1 | 10/2003 | Toerudbakken et al. |
| 6,674,720 B1 | 1/2004 | Passint et al. |
| 6,714,553 B1 | 3/2004 | Poole et al. |
| 6,728,211 B1 | 4/2004 | Peris et al. |
| 6,732,212 B2 | 5/2004 | Sugahara et al. |
| 6,735,173 B1 | 5/2004 | Lenoski et al. |
| 6,894,974 B1 | 5/2005 | Aweya et al. |
| 7,023,856 B1 | 4/2006 | Washabaugh et al. |

(56) References Cited

U.S. PATENT DOCUMENTS

| | | |
|---|---|---|
| 7,133,940 B2 | 11/2006 | Blightman et al. |
| 7,218,637 B1 | 5/2007 | Best et al. |
| 7,269,180 B2 | 9/2007 | Bly et al. |
| 7,305,487 B2 | 12/2007 | Blumrich et al. |
| 7,337,285 B2 | 2/2008 | Tanoue |
| 7,397,797 B2 | 7/2008 | Alfieri et al. |
| 7,430,559 B2 | 9/2008 | Lomet |
| 7,441,006 B2 | 10/2008 | Biran et al. |
| 7,464,174 B1 | 12/2008 | Ngai |
| 7,483,442 B1 | 1/2009 | Torudbakken et al. |
| 7,562,366 B2 | 7/2009 | Pope et al. |
| 7,593,329 B2 | 9/2009 | Kwan et al. |
| 7,596,628 B2 | 9/2009 | Aloni et al. |
| 7,620,791 B1 | 11/2009 | Wentzlaff et al. |
| 7,633,869 B1 | 12/2009 | Morris et al. |
| 7,639,616 B1 | 12/2009 | Manula et al. |
| 7,734,894 B1 | 6/2010 | Wentzlaff et al. |
| 7,774,461 B2 | 8/2010 | Tanaka et al. |
| 7,782,869 B1 | 8/2010 | Chitlur Srinivasa |
| 7,796,579 B2 | 9/2010 | Bruss |
| 7,856,026 B1 | 12/2010 | Finan et al. |
| 7,933,282 B1 | 4/2011 | Gupta et al. |
| 7,953,002 B2 | 5/2011 | Opsasnick |
| 7,975,120 B2 | 7/2011 | Sabbatini, Jr. et al. |
| 8,014,278 B1 | 9/2011 | Subramanian et al. |
| 8,023,521 B2 | 9/2011 | Woo et al. |
| 8,050,180 B2 | 11/2011 | Judd |
| 8,077,606 B1 | 12/2011 | Litwack |
| 8,103,788 B1 | 1/2012 | Miranda |
| 8,160,085 B2 | 4/2012 | Voruganti et al. |
| 8,175,107 B1 | 5/2012 | Yalagandula et al. |
| 8,249,072 B2 | 8/2012 | Sugumar et al. |
| 8,281,013 B2 | 10/2012 | Mundkur et al. |
| 8,352,727 B2 | 1/2013 | Chen et al. |
| 8,353,003 B2 | 1/2013 | Noehring et al. |
| 8,443,151 B2 | 5/2013 | Tang et al. |
| 8,473,783 B2 | 6/2013 | Andrade et al. |
| 8,543,534 B2 | 9/2013 | Alves et al. |
| 8,619,793 B2 | 12/2013 | Lavian et al. |
| 8,626,957 B2 | 1/2014 | Blumrich et al. |
| 8,650,582 B2 | 2/2014 | Archer et al. |
| 8,706,832 B2 | 4/2014 | Blocksome |
| 8,719,543 B2 | 5/2014 | Kaminski et al. |
| 8,811,183 B1 | 8/2014 | Anand et al. |
| 8,948,175 B2 | 2/2015 | Bly et al. |
| 8,971,345 B1 | 3/2015 | McCanne et al. |
| 9,001,663 B2 | 4/2015 | Attar et al. |
| 9,053,012 B1 | 6/2015 | Northcott et al. |
| 9,088,496 B2 | 7/2015 | Vaidya et al. |
| 9,094,327 B2 | 7/2015 | Jacobs et al. |
| 9,178,782 B2 | 11/2015 | Matthews et al. |
| 9,208,071 B2 | 12/2015 | Talagala et al. |
| 9,218,278 B2 | 12/2015 | Talagala et al. |
| 9,219,787 B1 * | 12/2015 | Manion ............... H04L 67/142 |
| 9,231,876 B2 | 1/2016 | Mir et al. |
| 9,231,888 B2 | 1/2016 | Bogdanski et al. |
| 9,239,804 B2 | 1/2016 | Kegel et al. |
| 9,269,438 B2 | 2/2016 | Nachimuthu et al. |
| 9,276,864 B1 | 3/2016 | Pradeep |
| 9,294,551 B1 * | 3/2016 | Froese ................ H04L 67/10 |
| 9,436,651 B2 | 9/2016 | Underwood et al. |
| 9,455,915 B2 | 9/2016 | Sinha et al. |
| 9,460,178 B2 | 10/2016 | Bashyam et al. |
| 9,479,426 B2 | 10/2016 | Munger et al. |
| 9,496,991 B2 | 11/2016 | Plamondon et al. |
| 9,544,234 B1 | 1/2017 | Markine |
| 9,548,924 B2 | 1/2017 | Pettit et al. |
| 9,594,521 B2 | 3/2017 | Blagodurov et al. |
| 9,635,121 B2 | 4/2017 | Mathew et al. |
| 9,742,855 B2 | 8/2017 | Shuler et al. |
| 9,762,488 B2 | 9/2017 | Previdi et al. |
| 9,762,497 B2 | 9/2017 | Kishore et al. |
| 9,830,273 B2 | 11/2017 | Bk et al. |
| 9,838,500 B1 | 12/2017 | Ilan et al. |
| 9,853,900 B1 | 12/2017 | Mula et al. |
| 9,887,923 B2 | 2/2018 | Chorafakis et al. |
| 10,003,544 B2 | 6/2018 | Liu et al. |
| 10,009,270 B1 | 6/2018 | Stark et al. |
| 10,031,857 B2 | 7/2018 | Menachem et al. |
| 10,050,896 B2 | 8/2018 | Yang et al. |
| 10,061,613 B1 | 8/2018 | Brooker et al. |
| 10,063,481 B1 | 8/2018 | Jiang et al. |
| 10,089,220 B1 | 10/2018 | McKelvie et al. |
| 10,169,060 B1 | 1/2019 | Vincent et al. |
| 10,178,035 B2 | 1/2019 | Dillon |
| 10,200,279 B1 | 2/2019 | Aljaedi |
| 10,218,634 B2 | 2/2019 | Aldebert et al. |
| 10,270,700 B2 | 4/2019 | Burnette et al. |
| 10,305,772 B2 | 5/2019 | Zur et al. |
| 10,331,590 B2 | 6/2019 | MacNamara et al. |
| 10,353,833 B2 | 7/2019 | Hagspiel et al. |
| 10,454,835 B2 | 10/2019 | Contavalli et al. |
| 10,498,672 B2 | 12/2019 | Graham et al. |
| 10,567,307 B2 | 2/2020 | Fairhurst et al. |
| 10,728,173 B1 | 7/2020 | Agrawal et al. |
| 10,802,828 B1 | 10/2020 | Volpe et al. |
| 10,817,502 B2 | 10/2020 | Talagala et al. |
| 11,128,561 B1 | 9/2021 | Matthews et al. |
| 11,271,869 B1 | 3/2022 | Agrawal et al. |
| 11,416,749 B2 | 8/2022 | Bshara et al. |
| 11,444,886 B1 | 9/2022 | Stawitzky et al. |
| 2001/0010692 A1 | 8/2001 | Sindhu et al. |
| 2001/0047438 A1 | 11/2001 | Forin |
| 2002/0174279 A1 | 11/2002 | Wynne et al. |
| 2003/0016808 A1 | 1/2003 | Hu et al. |
| 2003/0041168 A1 | 2/2003 | Musoll |
| 2003/0110455 A1 | 6/2003 | Baumgartner et al. |
| 2003/0174711 A1 | 9/2003 | Shankar |
| 2003/0200363 A1 | 10/2003 | Futral |
| 2003/0223420 A1 | 12/2003 | Ferolito |
| 2004/0008716 A1 | 1/2004 | Stiliadis |
| 2004/0059828 A1 | 3/2004 | Hooper et al. |
| 2004/0095882 A1 | 5/2004 | Hamzah et al. |
| 2004/0133634 A1 | 7/2004 | Luke et al. |
| 2004/0223452 A1 | 11/2004 | Santos et al. |
| 2005/0021837 A1 | 1/2005 | Haselhorst et al. |
| 2005/0047334 A1 | 3/2005 | Paul et al. |
| 2005/0088969 A1 | 4/2005 | Carlsen et al. |
| 2005/0091396 A1 | 4/2005 | Nilakantan et al. |
| 2005/0108444 A1 | 5/2005 | Flauaus et al. |
| 2005/0108518 A1 | 5/2005 | Pandya |
| 2005/0152274 A1 | 7/2005 | Simpson |
| 2005/0182854 A1 | 8/2005 | Pinkerton et al. |
| 2005/0270974 A1 | 12/2005 | Mayhew |
| 2005/0270976 A1 | 12/2005 | Yang et al. |
| 2006/0023705 A1 | 2/2006 | Zoranovic et al. |
| 2006/0067347 A1 | 3/2006 | Naik et al. |
| 2006/0075480 A1 | 4/2006 | Noehring et al. |
| 2006/0174251 A1 | 8/2006 | Pope et al. |
| 2006/0203728 A1 | 9/2006 | Kwan et al. |
| 2007/0061433 A1 | 3/2007 | Reynolds et al. |
| 2007/0070901 A1 | 3/2007 | Aloni et al. |
| 2007/0198804 A1 | 8/2007 | Moyer |
| 2007/0211746 A1 | 9/2007 | Oshikiri et al. |
| 2007/0242611 A1 | 10/2007 | Archer et al. |
| 2007/0268825 A1 | 11/2007 | Corwin et al. |
| 2008/0013453 A1 | 1/2008 | Chiang et al. |
| 2008/0013549 A1 | 1/2008 | Okagawa et al. |
| 2008/0071757 A1 | 3/2008 | Ichiriu et al. |
| 2008/0084864 A1 | 4/2008 | Archer et al. |
| 2008/0091915 A1 | 4/2008 | Moertl et al. |
| 2008/0147881 A1 * | 6/2008 | Krishnamurthy ....... H04L 45/02 709/238 |
| 2008/0159138 A1 | 7/2008 | Shepherd et al. |
| 2008/0253289 A1 | 10/2008 | Naven et al. |
| 2009/0003212 A1 | 1/2009 | Kwan et al. |
| 2009/0010157 A1 | 1/2009 | Holmes et al. |
| 2009/0013175 A1 | 1/2009 | Elliott |
| 2009/0037376 A1 * | 2/2009 | Archer .............. G06F 16/24532 |
| 2009/0055496 A1 | 2/2009 | Garg et al. |
| 2009/0064140 A1 * | 3/2009 | Arimilli ............ G06F 15/17356 718/100 |
| 2009/0092046 A1 | 4/2009 | Naven et al. |
| 2009/0141621 A1 | 6/2009 | Fan et al. |

(56) References Cited

U.S. PATENT DOCUMENTS

| | | |
|---|---|---|
| 2009/0198958 A1 | 8/2009 | Arimilli et al. |
| 2009/0259713 A1 | 10/2009 | Blumrich et al. |
| 2009/0285222 A1 | 11/2009 | Hoover et al. |
| 2010/0061241 A1 | 3/2010 | Sindhu et al. |
| 2010/0169608 A1 | 7/2010 | Kuo et al. |
| 2010/0172260 A1 | 7/2010 | Kwan et al. |
| 2010/0183024 A1 | 7/2010 | Gupta |
| 2010/0220595 A1 | 9/2010 | Petersen |
| 2010/0274876 A1 | 10/2010 | Kagan et al. |
| 2010/0302942 A1 | 12/2010 | Shankar et al. |
| 2010/0316053 A1 | 12/2010 | Miyoshi et al. |
| 2011/0051724 A1 | 3/2011 | Scott et al. |
| 2011/0066824 A1 | 3/2011 | Bestler |
| 2011/0072179 A1 | 3/2011 | Lacroute et al. |
| 2011/0099326 A1 | 4/2011 | Jung et al. |
| 2011/0110383 A1 | 5/2011 | Yang et al. |
| 2011/0128959 A1 | 6/2011 | Bando et al. |
| 2011/0158096 A1 | 6/2011 | Leung et al. |
| 2011/0158248 A1 | 6/2011 | Vorunganti et al. |
| 2011/0164496 A1 | 7/2011 | Loh et al. |
| 2011/0173370 A1 | 7/2011 | Jacobs et al. |
| 2011/0191496 A1* | 8/2011 | Luo .................. H04W 4/70 709/247 |
| 2011/0264822 A1 | 10/2011 | Ferguson et al. |
| 2011/0276699 A1 | 11/2011 | Pedersen |
| 2011/0280125 A1 | 11/2011 | Jayakumar |
| 2011/0296137 A1* | 12/2011 | Archer .............. G06F 15/17318 712/30 |
| 2011/0320724 A1 | 12/2011 | Mejdrich et al. |
| 2012/0093505 A1 | 4/2012 | Yeap et al. |
| 2012/0102506 A1 | 4/2012 | Hopmann et al. |
| 2012/0117423 A1 | 5/2012 | Andrade et al. |
| 2012/0137075 A1 | 5/2012 | Vorbach |
| 2012/0144064 A1 | 6/2012 | Parker et al. |
| 2012/0144065 A1 | 6/2012 | Parker et al. |
| 2012/0147752 A1 | 6/2012 | Ashwood-Smith et al. |
| 2012/0170462 A1 | 7/2012 | Sinha |
| 2012/0170575 A1 | 7/2012 | Mehra |
| 2012/0213118 A1 | 8/2012 | Lindsay et al. |
| 2012/0250512 A1 | 10/2012 | Jagadeeswaran et al. |
| 2012/0287821 A1 | 11/2012 | Godfrey et al. |
| 2012/0297083 A1 | 11/2012 | Ferguson et al. |
| 2012/0300669 A1 | 11/2012 | Zahavi |
| 2012/0314707 A1 | 12/2012 | Epps et al. |
| 2013/0010636 A1 | 1/2013 | Regula |
| 2013/0028133 A1* | 1/2013 | Narasimhan .......... H04L 69/22 370/254 |
| 2013/0039169 A1 | 2/2013 | Schlansker et al. |
| 2013/0060944 A1* | 3/2013 | Archer .............. G06F 15/17306 709/225 |
| 2013/0103777 A1 | 4/2013 | Kagan et al. |
| 2013/0121178 A1 | 5/2013 | Mainaud et al. |
| 2013/0136090 A1 | 5/2013 | Liu et al. |
| 2013/0182704 A1 | 7/2013 | Jacobs et al. |
| 2013/0194927 A1 | 8/2013 | Yamaguchi et al. |
| 2013/0203422 A1 | 8/2013 | Masputra et al. |
| 2013/0205002 A1 | 8/2013 | Wang et al. |
| 2013/0208593 A1 | 8/2013 | Nandagopal |
| 2013/0246552 A1 | 9/2013 | Underwood et al. |
| 2013/0290673 A1* | 10/2013 | Archer .............. G06F 15/17318 712/30 |
| 2013/0301645 A1 | 11/2013 | Bogdanski et al. |
| 2013/0304988 A1 | 11/2013 | Totolos et al. |
| 2013/0311525 A1 | 11/2013 | Neerincx et al. |
| 2013/0329577 A1 | 12/2013 | Suzuki et al. |
| 2013/0336164 A1 | 12/2013 | Yang et al. |
| 2014/0019661 A1 | 1/2014 | Hormuth et al. |
| 2014/0032695 A1 | 1/2014 | Michels et al. |
| 2014/0036680 A1 | 2/2014 | Lih et al. |
| 2014/0064082 A1 | 3/2014 | Yeung et al. |
| 2014/0095753 A1 | 4/2014 | Crupnicoff et al. |
| 2014/0098675 A1 | 4/2014 | Frost et al. |
| 2014/0119367 A1 | 5/2014 | Han et al. |
| 2014/0122560 A1 | 5/2014 | Ramey et al. |
| 2014/0129664 A1 | 5/2014 | McDaniel et al. |
| 2014/0133292 A1 | 5/2014 | Yamatsu et al. |
| 2014/0136646 A1 | 5/2014 | Tamir et al. |
| 2014/0169173 A1 | 6/2014 | Naouri et al. |
| 2014/0185621 A1 | 7/2014 | Decusatis et al. |
| 2014/0189174 A1 | 7/2014 | Ajanovic et al. |
| 2014/0207881 A1 | 7/2014 | Nussle et al. |
| 2014/0211804 A1 | 7/2014 | Makikeni et al. |
| 2014/0226488 A1 | 8/2014 | Shamis et al. |
| 2014/0241164 A1 | 8/2014 | Cociglio et al. |
| 2014/0258438 A1 | 9/2014 | Ayoub |
| 2014/0301390 A1 | 10/2014 | Scott et al. |
| 2014/0307554 A1 | 10/2014 | Basso et al. |
| 2014/0325013 A1 | 10/2014 | Tamir et al. |
| 2014/0328172 A1 | 11/2014 | Kumar et al. |
| 2014/0347997 A1 | 11/2014 | Bergamasco et al. |
| 2014/0348022 A1* | 11/2014 | Jain .................. H04L 41/12 370/254 |
| 2014/0362698 A1 | 12/2014 | Arad |
| 2014/0369360 A1 | 12/2014 | Carlstrom |
| 2014/0379847 A1 | 12/2014 | Williams |
| 2015/0003247 A1 | 1/2015 | Mejia et al. |
| 2015/0006849 A1 | 1/2015 | Xu et al. |
| 2015/0009823 A1 | 1/2015 | Ganga et al. |
| 2015/0026361 A1 | 1/2015 | Matthews et al. |
| 2015/0029848 A1 | 1/2015 | Jain |
| 2015/0055476 A1 | 2/2015 | Decusatis et al. |
| 2015/0055661 A1 | 2/2015 | Boucher et al. |
| 2015/0067095 A1 | 3/2015 | Gopal et al. |
| 2015/0089495 A1 | 3/2015 | Persson et al. |
| 2015/0103667 A1 | 4/2015 | Elias et al. |
| 2015/0124826 A1 | 5/2015 | Edsall et al. |
| 2015/0146527 A1 | 5/2015 | Kishore et al. |
| 2015/0154004 A1 | 6/2015 | Aggarwal |
| 2015/0161064 A1 | 6/2015 | Pope |
| 2015/0180782 A1 | 6/2015 | Rimmer et al. |
| 2015/0186318 A1 | 7/2015 | Kim et al. |
| 2015/0193262 A1 | 7/2015 | Archer et al. |
| 2015/0195388 A1 | 7/2015 | Snyder et al. |
| 2015/0208145 A1 | 7/2015 | Parker et al. |
| 2015/0220449 A1 | 8/2015 | Stark et al. |
| 2015/0237180 A1 | 8/2015 | Swartzentruber et al. |
| 2015/0244617 A1 | 8/2015 | Nakil et al. |
| 2015/0244804 A1 | 8/2015 | Warfield et al. |
| 2015/0261434 A1 | 9/2015 | Kagan et al. |
| 2015/0263955 A1 | 9/2015 | Talaski et al. |
| 2015/0263990 A1* | 9/2015 | Inoue ............... H04L 47/125 709/226 |
| 2015/0263994 A1 | 9/2015 | Haramaty et al. |
| 2015/0288626 A1 | 10/2015 | Aybay |
| 2015/0365337 A1 | 12/2015 | Pannell |
| 2015/0370586 A1 | 12/2015 | Cooper et al. |
| 2016/0006664 A1 | 1/2016 | Sabato et al. |
| 2016/0012002 A1 | 1/2016 | Arimilli et al. |
| 2016/0028613 A1 | 1/2016 | Haramaty et al. |
| 2016/0065455 A1 | 3/2016 | Wang et al. |
| 2016/0094450 A1 | 3/2016 | Ghanwani et al. |
| 2016/0134518 A1 | 5/2016 | Callon et al. |
| 2016/0134535 A1 | 5/2016 | Callon |
| 2016/0134559 A1 | 5/2016 | Abel et al. |
| 2016/0134573 A1 | 5/2016 | Gagliardi et al. |
| 2016/0142318 A1 | 5/2016 | Beecroft |
| 2016/0154756 A1 | 6/2016 | Dodson et al. |
| 2016/0182383 A1 | 6/2016 | Pedersen |
| 2016/0205023 A1 | 7/2016 | Janardhanan |
| 2016/0226797 A1 | 8/2016 | Aravinthan et al. |
| 2016/0254991 A1 | 9/2016 | Eckert et al. |
| 2016/0259394 A1 | 9/2016 | Ragavan |
| 2016/0283422 A1 | 9/2016 | Crupnicoff et al. |
| 2016/0285545 A1 | 9/2016 | Schmidtke et al. |
| 2016/0285677 A1 | 9/2016 | Kashyap et al. |
| 2016/0294694 A1 | 10/2016 | Parker et al. |
| 2016/0294926 A1 | 10/2016 | Zur et al. |
| 2016/0301610 A1 | 10/2016 | Amit et al. |
| 2016/0344620 A1 | 11/2016 | G. Santos et al. |
| 2016/0381189 A1 | 12/2016 | Caulfield et al. |
| 2017/0024263 A1 | 1/2017 | Verplanken |
| 2017/0039063 A1 | 2/2017 | Gopal et al. |
| 2017/0041239 A1 | 2/2017 | Goldenberg et al. |

(56) References Cited

U.S. PATENT DOCUMENTS

| | | |
|---|---|---|
| 2017/0048144 A1 | 2/2017 | Liu |
| 2017/0054633 A1 | 2/2017 | Underwood et al. |
| 2017/0063613 A1* | 3/2017 | Bloch .................... H04L 12/44 |
| 2017/0091108 A1 | 3/2017 | Arellano et al. |
| 2017/0097840 A1 | 4/2017 | Bridgers |
| 2017/0103108 A1 | 4/2017 | Datta et al. |
| 2017/0109385 A1* | 4/2017 | Aronovich .......... G06F 16/9027 |
| 2017/0118090 A1 | 4/2017 | Pettit et al. |
| 2017/0118098 A1 | 4/2017 | Littlejohn et al. |
| 2017/0153852 A1 | 6/2017 | Ma et al. |
| 2017/0177541 A1 | 6/2017 | Berman et al. |
| 2017/0187674 A1* | 6/2017 | Lee .................... H04L 61/5069 |
| 2017/0220500 A1 | 8/2017 | Tong |
| 2017/0237654 A1 | 8/2017 | Turner et al. |
| 2017/0237671 A1 | 8/2017 | Rimmer et al. |
| 2017/0242753 A1 | 8/2017 | Sherlock et al. |
| 2017/0250914 A1 | 8/2017 | Caulfield et al. |
| 2017/0251394 A1 | 8/2017 | Johansson et al. |
| 2017/0270051 A1 | 9/2017 | Chen et al. |
| 2017/0272331 A1 | 9/2017 | Lissack |
| 2017/0272370 A1 | 9/2017 | Ganga et al. |
| 2017/0286316 A1 | 10/2017 | Doshi et al. |
| 2017/0289066 A1 | 10/2017 | Haramaty et al. |
| 2017/0295098 A1 | 10/2017 | Watkins et al. |
| 2017/0324664 A1 | 11/2017 | Xu et al. |
| 2017/0371778 A1 | 12/2017 | McKelvie et al. |
| 2018/0004705 A1 | 1/2018 | Menachem et al. |
| 2018/0019948 A1 | 1/2018 | Patwardhan et al. |
| 2018/0026878 A1 | 1/2018 | Zahavi et al. |
| 2018/0077064 A1 | 3/2018 | Wang |
| 2018/0083868 A1 | 3/2018 | Cheng |
| 2018/0097645 A1 | 4/2018 | Rajagopalan et al. |
| 2018/0097912 A1 | 4/2018 | Chumbalkar et al. |
| 2018/0113618 A1 | 4/2018 | Chan et al. |
| 2018/0115469 A1 | 4/2018 | Erickson et al. |
| 2018/0131602 A1 | 5/2018 | Civanlar et al. |
| 2018/0131678 A1 | 5/2018 | Agarwal et al. |
| 2018/0150374 A1 | 5/2018 | Ratcliff |
| 2018/0152317 A1 | 5/2018 | Chang et al. |
| 2018/0152357 A1 | 5/2018 | Natham et al. |
| 2018/0173557 A1 | 6/2018 | Nakil et al. |
| 2018/0183724 A1 | 6/2018 | Callard et al. |
| 2018/0191609 A1 | 7/2018 | Caulfield et al. |
| 2018/0198736 A1 | 7/2018 | Labonte et al. |
| 2018/0212876 A1 | 7/2018 | Bacthu et al. |
| 2018/0212902 A1 | 7/2018 | Steinmacher-Burow |
| 2018/0219804 A1 | 8/2018 | Graham et al. |
| 2018/0225238 A1 | 8/2018 | Karguth et al. |
| 2018/0234343 A1 | 8/2018 | Zdornov et al. |
| 2018/0254945 A1 | 9/2018 | Bogdanski et al. |
| 2018/0260324 A1 | 9/2018 | Marathe et al. |
| 2018/0278540 A1 | 9/2018 | Shalev et al. |
| 2018/0287928 A1 | 10/2018 | Levi et al. |
| 2018/0323898 A1 | 11/2018 | Dods |
| 2018/0335974 A1 | 11/2018 | Simionescu et al. |
| 2018/0341494 A1 | 11/2018 | Sood et al. |
| 2019/0007349 A1 | 1/2019 | Wang et al. |
| 2019/0018808 A1 | 1/2019 | Beard et al. |
| 2019/0036771 A1 | 1/2019 | Sharpless et al. |
| 2019/0042337 A1 | 2/2019 | Dinan et al. |
| 2019/0042518 A1 | 2/2019 | Marolia |
| 2019/0044809 A1 | 2/2019 | Willis et al. |
| 2019/0044827 A1 | 2/2019 | Ganapathi et al. |
| 2019/0044863 A1 | 2/2019 | Mula et al. |
| 2019/0044872 A1 | 2/2019 | Ganapathi et al. |
| 2019/0044875 A1 | 2/2019 | Murty et al. |
| 2019/0052327 A1 | 2/2019 | Motozuka et al. |
| 2019/0058663 A1 | 2/2019 | Song |
| 2019/0068501 A1 | 2/2019 | Schneider et al. |
| 2019/0081903 A1 | 3/2019 | Kobayashi et al. |
| 2019/0095134 A1 | 3/2019 | Li |
| 2019/0104057 A1 | 4/2019 | Goel et al. |
| 2019/0104206 A1 | 4/2019 | Goel et al. |
| 2019/0108106 A1 | 4/2019 | Aggarwal et al. |
| 2019/0108332 A1 | 4/2019 | Glew et al. |
| 2019/0109791 A1 | 4/2019 | Mehra et al. |
| 2019/0121781 A1 | 4/2019 | Kasichainula |
| 2019/0140979 A1 | 5/2019 | Levi et al. |
| 2019/0146477 A1 | 5/2019 | Cella et al. |
| 2019/0171612 A1 | 6/2019 | Shahar et al. |
| 2019/0196982 A1 | 6/2019 | Rozas et al. |
| 2019/0199646 A1 | 6/2019 | Singh et al. |
| 2019/0253354 A1 | 8/2019 | Caulfield et al. |
| 2019/0280978 A1 | 9/2019 | Schmatz et al. |
| 2019/0294575 A1 | 9/2019 | Dennison et al. |
| 2019/0306134 A1 | 10/2019 | Shanbhogue et al. |
| 2019/0332314 A1 | 10/2019 | Zhang et al. |
| 2019/0334624 A1 | 10/2019 | Bernard |
| 2019/0356611 A1 | 11/2019 | Das et al. |
| 2019/0361728 A1 | 11/2019 | Kumar et al. |
| 2019/0379610 A1 | 12/2019 | Srinivasan et al. |
| 2020/0036644 A1 | 1/2020 | Belogolovy et al. |
| 2020/0084150 A1 | 3/2020 | Burstein et al. |
| 2020/0145725 A1 | 5/2020 | Eberle et al. |
| 2020/0177505 A1 | 6/2020 | Li |
| 2020/0177521 A1 | 6/2020 | Blumrich et al. |
| 2020/0259755 A1 | 8/2020 | Wang et al. |
| 2020/0272579 A1 | 8/2020 | Humphrey et al. |
| 2020/0274832 A1 | 8/2020 | Humphrey et al. |
| 2020/0334195 A1 | 10/2020 | Chen et al. |
| 2020/0349098 A1 | 11/2020 | Caulfield et al. |
| 2021/0081410 A1 | 3/2021 | Chavan et al. |
| 2021/0152494 A1 | 5/2021 | Johnsen et al. |
| 2021/0263779 A1 | 8/2021 | Haghighat et al. |
| 2021/0334206 A1 | 10/2021 | Colgrove et al. |
| 2021/0377156 A1 | 12/2021 | Michael et al. |
| 2021/0409351 A1 | 12/2021 | Das et al. |
| 2022/0131768 A1 | 4/2022 | Ganapathi et al. |
| 2022/0166705 A1 | 5/2022 | Froese |
| 2022/0200900 A1 | 6/2022 | Roweth |
| 2022/0210058 A1 | 6/2022 | Bataineh et al. |
| 2022/0217078 A1 | 7/2022 | Ford et al. |
| 2022/0217101 A1 | 7/2022 | Yefet et al. |
| 2022/0245072 A1 | 8/2022 | Roweth et al. |
| 2022/0278941 A1 | 9/2022 | Shalev et al. |
| 2022/0309025 A1 | 9/2022 | Chen et al. |
| 2023/0035420 A1 | 2/2023 | Sankaran et al. |
| 2023/0046221 A1 | 2/2023 | Pismenny et al. |

FOREIGN PATENT DOCUMENTS

| | | |
|---|---|---|
| CN | 110324249 A | 10/2019 |
| CN | 110601888 A | 12/2019 |
| EP | 0275135 A2 | 7/1988 |
| EP | 2187576 A1 | 5/2010 |
| EP | 2219329 A1 | 8/2010 |
| EP | 2947832 A1 | 11/2015 |
| EP | 3445006 A1 | 2/2019 |
| JP | 2003-244196 A | 8/2003 |
| JP | 3459653 B2 | 10/2003 |
| KR | 10-2012-0062864 A | 6/2012 |
| KR | 10-2012-0082739 A | 7/2012 |
| KR | 10-2014-0100529 A | 8/2014 |
| KR | 10-2015-0026939 A | 3/2015 |
| KR | 10-2015-0104056 A | 9/2015 |
| KR | 10-2017-0110106 A | 10/2017 |
| KR | 10-1850749 B1 | 4/2018 |
| WO | 2001/069851 A2 | 9/2001 |
| WO | 02/47329 A2 | 6/2002 |
| WO | 2003/019861 A2 | 3/2003 |
| WO | 2004/001615 A1 | 12/2003 |
| WO | 2005/094487 A2 | 10/2005 |
| WO | 2007/034184 A2 | 3/2007 |
| WO | 2009/010461 A2 | 1/2009 |
| WO | 2009/018232 A1 | 2/2009 |
| WO | 2014/092780 A1 | 6/2014 |
| WO | 2014/137382 A1 | 9/2014 |
| WO | 2014/141005 A1 | 9/2014 |
| WO | 2018/004977 A1 | 1/2018 |
| WO | 2018/046703 A1 | 3/2018 |
| WO | 2019/072072 A1 | 4/2019 |

(56) References Cited

OTHER PUBLICATIONS

Belayneh L.W., et al.; "Method and Apparatus for Routing Data in an Inter-Nodal Communications Lattice of a Massively Parallel Computer System by Semi-Randomly Varying Routing Policies for Different Packets"; 2019; 3 pages.
Bhatele, A., et al.; "Analyzing Network Health and Congestion in Dragonfly-based Supercomputers"; May 23-27, 2016; 10 pages.
Blumrich, M.A., et al.; "Exploiting Idle Resources in a High-Radix Switch for Supplemental Storage"; Nov. 2018; 13 pages.
Chang, F., et al.; "PVW: Designing Virtual World Server Infrastructure"; 2010; 8 pages.
Chen, F., et al.; "Requirements for RoCEv3 Congestion Management"; Mar. 21, 2019; 8 pages.
Cisco Packet Tracer; "packet-tracer;—ping"; https://www.cisco.com/c/en/us/td/docs/security/asa/asa-command-reference/I-R/cmdref2/p1.html; 2017.
Cisco; "Understanding Rapid Spanning Tree Protocol (802.1w)"; Aug. 1, 2017; 13 pages.
Eardley, Ed, P; "Pre-Congestion Notification (PCN) Architecture"; Jun. 2009; 54 pages.
Escudero-Sahuquillo, J., et al.; "Combining Congested-Flow Isolation and Injection Throttling in HPC Interconnection Networks"; Sep. 13-16, 2011; 3 pages.
Hong, Y.; "Mitigating the Cost, Performance, and Power Overheads Induced by Load Variations in Multicore Cloud Servers"; Fall 2013; 132 pages.
Huawei; "The Lossless Network for Data Centers"; Nov. 7, 2017; 15 pages.
International Search Report and Written Opinion received for PCT Application No. PCT/US2020/024248, mailed on Jul. 8, 2020, 11 pages.
International Search Report and Written Opinion received for PCT Application No. PCT/US20/024332, mailed on Jul. 8, 2020, 13 pages.
International Search Report and Written Opinion received for PCT Application No. PCT/US20/24243, mailed on Jul. 9, 2020, 10 pages.
International Search Report and Written Opinion received for PCT Application No. PCT/US20/24253, mailed on Jul. 6, 2020, 12 pages.
International Search Report and Written Opinion received for PCT Application No. PCT/US20/24256, mailed on Jul. 7, 2020, 11 pages.
International Search Report and Written Opinion received for PCT Application No. PCT/US20/24257, mailed on Jul. 7, 2020, 10 pages.
International Search Report and Written Opinion received for PCT Application No. PCT/US20/24258, mailed on Jul. 7, 2020, 9 pages.
International Search Report and Written Opinion received for PCT Application No. PCT/US20/24259, mailed on Jul. 9, 2020, 13 pages.
International Search Report and Written Opinion received for PCT Application No. PCT/US20/24260, mailed on Jul. 7, 2020, 11 pages.
International Search Report and Written Opinion received for PCT Application No. PCT/US20/24268, mailed on Jul. 9, 2020, 11 pages.
International Search Report and Written Opinion received for PCT Application No. PCT/US20/24339, mailed on Jul. 8, 2020, 11 pages.
International Search Report and Written Opinion received for PCT Application No. PCT/US2020/024125, mailed on Jul. 10, 2020, 5 pages.
International Search Report and Written Opinion received for PCT Application No. PCT/US2020/024129, mailed on Jul. 10, 2020, 11 pages.
International Search Report and Written Opinion received for PCT Application No. PCT/US2020/024237, mailed on Jul. 14, 2020, 5 pages.
International Search Report and Written Opinion received for PCT Application No. PCT/US2020/024239, mailed on Jul. 14, 2020, 11 pages.
International Search Report and Written Opinion received for PCT Application No. PCT/US2020/024241, mailed on Jul. 14, 2020, 13 pages.
International Search Report and Written Opinion received for PCT Application No. PCT/US2020/024242, mailed on Jul. 6, 2020, 11 pages.
International Search Report and Written Opinion received for PCT Application No. PCT/US2020/024244, mailed on Jul. 13, 2020, 10 pages.
International Search Report and Written Opinion received for PCT Application No. PCT/US2020/024245, mailed on Jul. 14, 2020, 11 pages.
International Search Report and Written Opinion received for PCT Application No. PCT/US2020/024246, mailed on Jul. 14, 2020, 10 pages.
International Search Report and Written Opinion received for PCT Application No. PCT/US2020/024250, mailed on Jul. 14, 2020, 12 pages.
International Search Report and Written Opinion received for PCT Application No. PCT/US2020/024254, mailed on Jul. 13, 2020, 10 pages.
International Search Report and Written Opinion received for PCT Application No. PCT/US2020/024262, mailed on Jul. 13, 2020, 10 pages.
International Search Report and Written Opinion received for PCT Application No. PCT/US2020/024266, mailed on Jul. 9, 2020, 10 pages.
International Search Report and Written Opinion received for PCT Application No. PCT/US2020/024270, mailed on Jul. 10, 2020, 13 pages.
International Search Report and Written Opinion received for PCT Application No. PCT/US2020/024271, mailed on Jul. 9, 2020, 10 pages.
International Search Report and Written Opinion received for PCT Application No. PCT/US2020/024272, mailed on Jul. 9, 2020, 10 pages.
International Search Report and Written Opinion received for PCT Application No. PCT/US2020/024276, mailed on Jul. 13, 2020, 9 pages.
International Search Report and Written Opinion received for PCT Application No. PCT/US2020/024304, mailed on Jul. 15, 2020, 11 pages.
International Search Report and Written Opinion received for PCT Application No. PCT/US2020/024311, mailed on Jul. 17, 2020, 8 pages.
International Search Report and Written Opinion received for PCT Application No. PCT/US2020/024321, mailed on Jul. 9, 2020, 9 pages.
International Search Report and Written Opinion received for PCT Application No. PCT/US2020/024324, mailed on Jul. 14, 2020, 10 pages.
International Search Report and Written Opinion received for PCT Application No. PCT/US2020/024327, mailed on Jul. 10, 2020, 15 pages.
International Search Report and Written Opinion received for PCT Application No. PCT/US2020/24158, mailed on Jul. 6, 2020, 18 pages.
International Search Report and Written Opinion received for PCT Application No. PCT/US2020/24251, mailed on Jul. 6, 2020, 11 pages.
International Search Report and Written Opinion received for PCT Application No. PCT/US2020/24267, mailed on Jul. 6, 2020, 9 pages.
International Search Report and Written Opinion received for PCT Patent Application No. PCT/US20/24303, mailed on Oct. 21, 2020, 9 pages.
International Search Report and Written Opinion received for PCT Patent Application No. PCT/US20/24340, mailed on Oct. 26, 2020, 9 pages.

(56) References Cited

OTHER PUBLICATIONS

International Search Report and Written Opinion received for PCT Patent Application No. PCT/US20/24342, mailed on Oct. 27, 2020, 10 pages.
International Search Report and Written Opinion received for PCT Patent Application No. PCT/US2020/024192, mailed on Oct. 23, 2020, 9 pages.
International Search Report and Written Opinion received for PCT Patent Application No. PCT/US2020/024221, mailed on Oct. 26, 2020, 9 pages.
International Search Report cited in PCT/US2020/024170 mailed Dec. 16, 2020; 3 pages.
Maabi, S., et al.; "ERFAN: Efficient reconfigurable fault-tolerant deflection routing algorithm for 3-D Network-on-Chip"; Sep. 6-9, 2016.
Maglione-Mathey, G., et al.; "Scalable Deadlock-Free Deterministic Minimal-Path Routing Engine for InfiniBand-Based Dragonfly Networks"; Aug. 21, 2017; 15 pages.
Mammeri, Z; "Reinforcement Learning Based Routing in Networks: Review and Classification of Approaches"; Apr. 29, 2019; 35 pages.
Mollah; M. A., et al.; "High Performance Computing Systems. Performance Modeling, Benchmarking, and Simulation: 8th International Workshop"; Nov. 13, 2017.
Open Networking Foundation; "OpenFlow Switch Specification"; Mar. 26, 2015; 283 pages.
Prakash, P., et al.; "The TCP Outcast Problem: Exposing Unfairness in Data Center Networks"; 2011; 15 pages.
Ramakrishnan, K., et al.; "The Addition of Explicit Congestion Notification (ECN) to IP"; Sep. 2001; 63 pages.
Roth, P. C., et al; "MRNet: A Software-Based Multicast/Reduction Network for Scalable Tools1"; Nov. 15-21, 2003; 16 pages.
Silveira, J., et al.; "Preprocessing of Scenarios for Fast and Efficient Routing Reconfiguration in Fault-Tolerant NoCs"; Mar. 4-6, 2015.
Tsunekawa, K.; "Fair bandwidth allocation among LSPs for AF class accommodating TCP and UDP traffic in a Diffserv-capable MPLS network"; Nov. 17, 2005; 9 pages.
Underwood, K.D., et al.; "A hardware acceleration unit for MPI queue processing"; Apr. 18, 2005; 10 pages.
Wu, J.; "Fault-tolerant adaptive and minimal routing in mesh-connected multicomputers using extended safety levels"; Feb. 2000; 11 pages.
Xiang, D., et al.; "Fault-Tolerant Adaptive Routing in Dragonfly Networks"; Apr. 12, 2017; 15 pages.
Xiang, D., et al; "Deadlock-Free Broadcast Routing in Dragonfly Networks without Virtual Channels", submission to IEEE transactions on Parallel and Distributed Systems, 2015, 15 pages.
Chang, F., et al.; "PVW: Designing Vir PVW: Designing Virtual World Ser orld Server Infr er Infrastructurastructure"; 2010; 8 pages.
International Search Report and Written Opinion received for PCT Application No. PCT/US20/24269, mailed on July 9. 2020, 11 pages.
Mamidala, A. R., et al.; "Efficient Barrier and Allreduce on Infiniband clusters using multicast and adaptive algorithms"; Sep. 20-23, 2004; 10 pages.
Ramakrishnan et al, RFC 3168, "The addition of Explicit Congestion Notification (ECN) to IP", Sep. 2001 (Year: 2001).
Extended European Search Report and Search Opinion received for EP Application No. 20809930.9, mailed on Mar. 2, 2023, 9 pages.
Extended European Search Report and Search Opinion received for EP Application No. 20810784.7, mailed on Mar. 9, 2023, 7 pages.

* cited by examiner

| Opcode   | Mnemonic          | Description                                  |
|----------|-------------------|----------------------------------------------|
| 00 0000  | BARRIER           | No-op reduction                              |
| 00 0001  | BIT_AND           | Bitwise AND                                  |
| 00 0010  | BIT_OR            | Bitwise OR                                   |
| 00 0011  | BIT_XOR           | Bitwise XOR                                  |
| 01 0000  | INT_MIN           | Integer minimum                              |
| 01 0001  | INT_MAX           | Integer maximum                              |
| 01 0010  | INT_MINMAXLOC     | Integer min max with indexes                 |
| 01 0100  | INT_SUM           | Integer sum                                  |
| 10 0000  | FLT_MIN           | Floating point minimum                       |
| 10 0001  | FLT_MAX           | Floating point maximum                       |
| 10 0010  | FLT_MINMAXLOC     | Floating point min max with indexes          |
| 10 0100  | FLT_MINNUM        | Floating point minimum number                |
| 10 0101  | FLT_MAXNUM        | Floating point maximum number                |
| 10 0110  | FLT_MINMAXNUMLOC  | Floating point min max number with indexes   |
| 10 1fr   | FLT_SUM           | Floating point sum<br>f = flush-to-zero<br>r = Rounding mode |
| 11 0000  | FLT_REPSUM        | Reproducible floating point sum              |

FIG. 7

| Operand | Field   | Description           |
|---------|---------|-----------------------|
| 0       | MIN     | Minimum value         |
| 1       | MINLOC  | Index of minimum value|
| 2       | MAX     | Maximum value         |
| 3       | MAXLOC  | Index of maximum value|

FIG. 8

| Mode | Name      | Description                  |
|------|-----------|------------------------------|
| 0    | RND_NEAR  | round to nearest             |
| 1    | RND_CEIL  | round toward infinity        |
| 2    | RND_FLOOR | round toward negative infinity |
| 3    | RND_CHOP  | round toward zero            |

FIG. 9

| Field | Description | Byte offset | Bytes |
|---|---|---|---|
| portals_header | Portals header | 0 | 20 |
| portals_command | Portals command | 20 | 16 |
| red_header | Reduction header | 36 | 12 |
| rt_data | Operands | 48 | 32 |
| | FCS | 80 | 4 |

FIG. 10

| Field | Description | Bit Location | Required in multicast arm | Size (bits) |
|---|---|---|---|---|
| rt_cookie | Cookie value | 95-64 | Yes | 32 |
| | Padding | 63-61 | | 3 |
| rt_repsum_ofw_id | For REPSUM, the most significant operand to raise int_overflow | 60-59 | | 2 |
| rt_repsum_m | Reproducible sum M | 58-51 | | 8 |
| rt_rc | Result code | 50-47 | | 4 |
| rt_resno | Result number | 46-37 | | 10 |
| rt_count | Number of contributions | 36-17 | | 20 |
| rt_op | Reduction operation | 16-11 | | 6 |
| rt_arm | Multicast arm command | 10 | Yes | 1 |
| rt_seqno | Sequence number | 9-0 | Yes | 10 |

FIG. 11

| Field | Description | Byte Offset | Bytes |
|---|---|---|---|
| rt_data[0] | Operand 0 | 0 | 8 |
| rt_data[1] | Operand 1 | 8 | 8 |
| rt_data[2] | Operand 2 | 16 | 8 |
| rt_data[3] | Operand 3 | 24 | 8 |

FIG. 12

| Result code | Name | Ops affected | Description |
|---|---|---|---|
| 0 | none | all | No error |
| 1 | flt_inexact | FLT_SUM | result was rounded |
| 2 | reserved | | |
| 3 | flt_overflow | FLT_SUM | result too large to represent |
| 4 | flt_invalid | FLT_SUM, FLT_MIN*, FLT_MAX* | An operand was a signaling NaN or two infinities were subtracted |
| 5 | repsum_inexact | FLT_REPSUM | result was rounded |
| 6 | int_overflow | INT_SUM, FLT_REPSUM | integer overflow |
| 7 | cont_overflow | all | Contributions exceed rt_waitcount |
| 8 | op_mismatch | all | rt_op mismatch |
| 9-15 | reserved | | |

FIG. 13

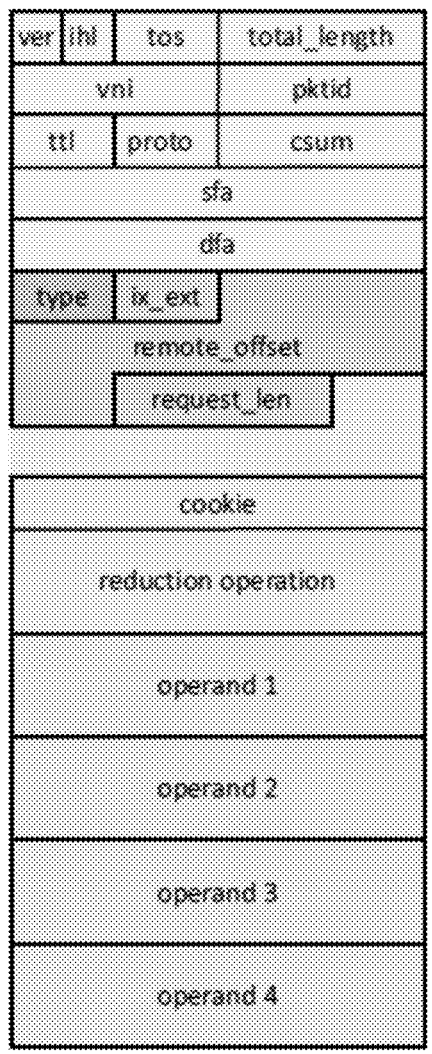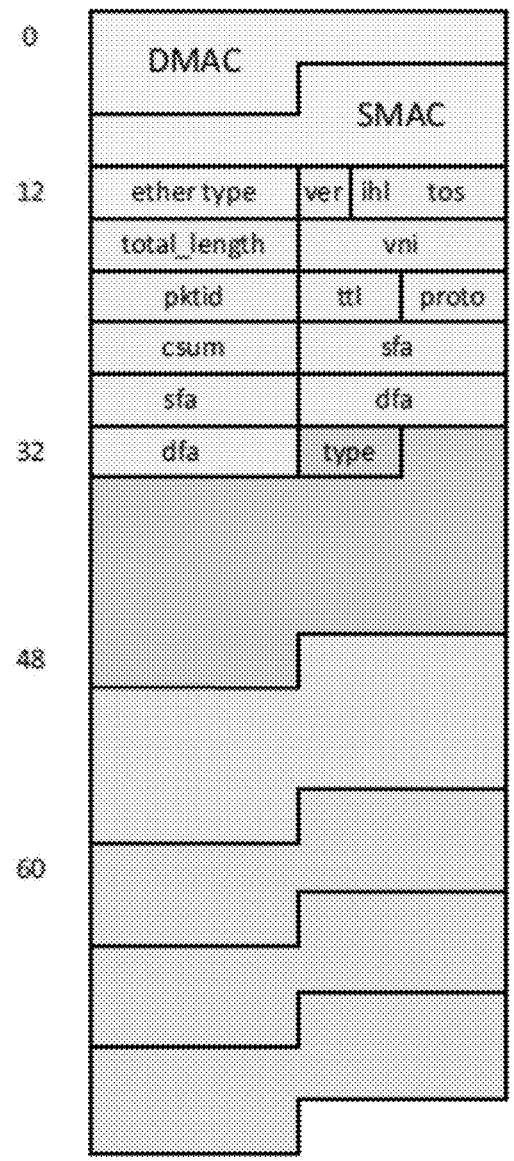
FIG. 14

SYSTEM AND METHOD FOR PERFORMING ON-THE-FLY REDUCTION IN A NETWORK

BACKGROUND

Field

This is generally related to the technical field of networking. More specifically, this disclosure is related to systems and methods for performing on-the-fly reduction in a network.

Related Art

As network-enabled devices and applications become progressively more ubiquitous, various types of traffic as well as the ever-increasing network load continue to demand more performance from the underlying network architecture. For example, applications such as high-performance computing (HPC), media streaming, and Internet of Things (JOT) can generate different types of traffic with distinctive characteristics. As a result, in addition to conventional network performance metrics such as bandwidth and delay, network architects continue to face challenges such as scalability, versatility, and efficiency.

SUMMARY

A switch capable of on-the-fly reduction in a network is provided. The switch is equipped with a reduction engine that can be dynamically configured to perform on-the-fly reduction. As a result, the network can facilitate an efficient and scalable environment for high performance computing.

BRIEF DESCRIPTION OF THE FIGURES

FIG. 7 shows exemplary reduction operations.

FIG. 8 shows a set of MINMAXLOC operands that can be used in a reduction process.

FIG. 9 shows rounding modes that can be used in a reduction process.

FIG. 10 shows a Portals-formatted reduction frame.

FIG. 11 shows a reduction header.

FIG. 12 shows the endianness of operands that can be used for MINMAXLOC reproducible sum operators in a reduction process.

FIG. 13 shows exemplary reduction result codes

FIG. 14 shows an example where a Portals packet can be prepended with an Ethernet header.

In the figures, like reference numerals refer to the same figure elements.

DETAILED DESCRIPTION

Figure 1:
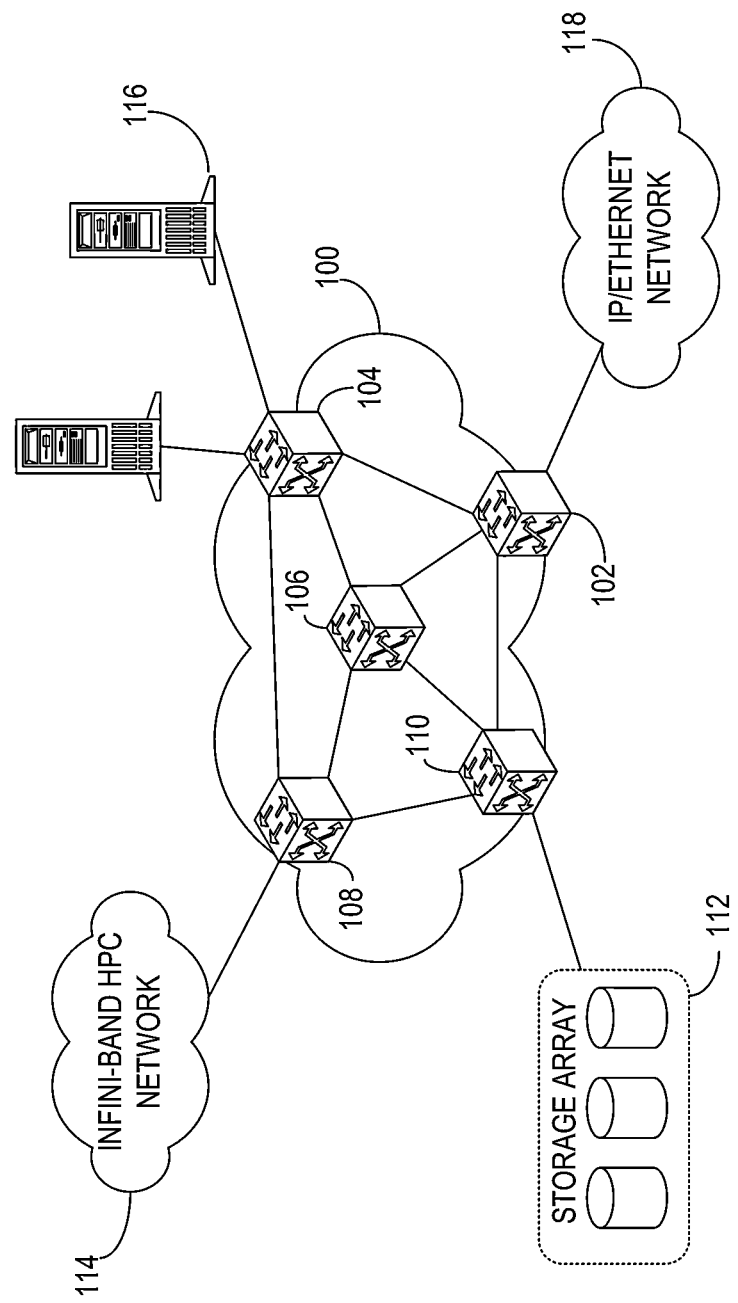
FIG. 1 shows an exemplary network.

Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown.

Embodiments of the present invention solve the problem of accommodating a large number of computing endpoints in a network by providing a reduction engine that can be dynamically configured, which allows traffic resulting from large-scale computing to be reduced in a timely, flexible, and scalable manner. Allocation and management of any shared resource within the body of a network can be difficult, especially if errors occur while the unit is processing data. The systems and methods described herein can significantly simplify the allocation, deallocation, and error handling of a dynamically allocated switch/router resource.

In general, a network can support thousands of users. If a function is provided, and expected to be used by any user, it is important to manage the resource efficiently. One approach can be to use a system call to a network-based server that has been authorized to manage the function. Although this may appear to be a simple solution, in practice the management could become complicated, especially if the function provided is widely distributed throughout the network and thousands of users may be trying to gain access. The time it takes to setup an operation for a single use can run into many seconds, and a similar amount of time may be required to release the function after use. Any error condition may also require significant support in both software development and real time analysis during the error condition.

The type of function being used may only be active for a few microseconds or even a few nanoseconds. Even if the function is repeatedly used by the same application, the setup and teardown cost could dwarf the amount of time the function is being useful. For computing features with such an enormous overhead, using software to gain and release access to such functions may not be able to accommodate a large number of users.

Embodiments of the present invention can provide reasonably fair access to all users of the network while reducing the setup cost and ensure the resource can be released quickly on a successful completion of the operation. It can also ensure the resource is released reasonably quickly (e.g., a few milliseconds) when an error occurs, without the need for any management software intervention.

Specifically, a reduction engine can be provided within a switch. The reduction engine can take packets from a number of endpoints and combine them to generate a single packet that can be returned to a node. The reduction engine can also perform a synchronization function, often referred to as a barrier, or can perform some mathematical function that combines or sorts the values provided by the endpoints into a single value. By placing the reduction engine within the body of the network, the latency, i.e., the time it takes to complete the operation, can be reduced by an order of magnitude because typically a single round of communication across the network is usually sufficient to complete the whole reduction.

The reduction process can use a multicast session, issued from a reduction root node's edge port and sent to all the edge leaf ports, to setup or arm each of the reduction engines within the network. Each port of the switches within the network can have an instance of the reduction engine. The arming multicast (i.e., the multicast setup packet) can start at the root node's ingress edge port. When the setup packet is received, it can arm the local reduction engine associated with the corresponding port. The packet can then be multicast to a number of output ports where it is forwarded to the output's link partner ingress port, which can reside on another switch. The downstream switch can further multicast the setup packet to a set of output ports while at the same time arming an instance of a reduction engine associated with the ingress port.

The above process can repeat, arming reduction engines along the multicast data path until the setup packet arrives at the egress edge ports of the leaf switches where it is passed to the compute node. At this point, all the reduction engines can be armed and ready to receive the reduction packets, which can travel upstream along the multicast tree and be reduced to a single packet that represents a reduced result.

After a computation operation, the leaf nodes can be ready to inject their result packets back into the network. They can do so in a way that causes the packet to retrace on the reverse path taken by the original multicast packet. This ensures the result packets can each be intercepted by the now armed reduction engines where the reduction function can take place.

The multicast tree can be traversed by the result packets in the reverse direction through the network. This reduction process does not require any software intervention, other than setting up the initial multicast tree. Modern switching devices typically can accommodate a large number of separate multicast trees, which allows many reduction configurations to be simultaneously configured in a network. As a result, the setup and teardown cost can be significantly amortized and parallelized, which allows the reduction function to be scaled to a large number of users.

It is also possible to add a count value to each reduction packet to represent the number of inputs used to construct the reduction result held within the packet. This allows the acceleration provided by a reduction engine to be skipped, if necessary, without affecting the reduction function. This is possible because the receiving node is then given enough information to complete the operation itself.

A timeout mechanism can also be added to the reduction engines to ensure the reduction engine resource can eventually become free, even in the presence of errors. If an error occurs, or if the reduction is not able to complete because one of the inputs to the reduction function is not present or is delayed for some reason, the timeout can ensure that the resource is released with the available input information that can be used for the reduction computation, up to that point. The root node of the reduction can receive this partial result and recognize that this result is not complete. The root node can optionally wait for the missing result to arrive without blocking the shared reduction resource.

FIG. 1 shows an exemplary network. In this example, a network 100 of switches, which can also be referred to as a "switch fabric," can include switches 102, 104, 106, 108, and 110. Each switch can have a unique address or ID within switch fabric 100. Various types of devices and networks can be coupled to a switch fabric. For example, a storage array 112 can be coupled to switch fabric 100 via switch 110; an InfiniBand (IB) based HPC network 114 can be coupled to switch fabric 100 via switch 108; a number of end hosts, such as host 116, can be coupled to switch fabric 100 via switch 104; and an IP/Ethernet network 118 can be coupled to switch fabric 100 via switch 102. In general, a switch can have edge ports and fabric ports. An edge port can couple to a device that is external to the fabric. A fabric port can couple to another switch within the fabric via a fabric link. Typically, traffic can be injected into switch fabric 100 via an ingress port of an edge switch, and leave switch fabric 100 via an egress port of another (or the same) edge switch. An ingress link can couple a network interface controller (NIC) of an edge device (for example, an HPC end host) to an ingress edge port of an edge switch. Switch fabric 100 can then transport the traffic to an egress edge switch, which in turn can deliver the traffic to a destination edge device via another NIC.

In one embodiment, each port of a switch can include a reduction engine that is used to accelerate reduction operations. Reductions can be performed using a multicast tree. Each reduction engine in the multicast tree can be armed by a reduction arm frame sent by a root switch through the multicast tree. After receiving the reduction arm frame, leaf nodes of the multicast tree can send reduction data frames containing their contributions up the multicast tree to the root node. Each reduction engine in the tree can intercept the reduction data frames and perform reduction on them. When a reduction engine receives the expected number of contributions or times out, it can forward the reduced result up the multicast tree. The root node may receive a single, fully reduced data frame, or, if any reduction engine times out, it may receive multiple, partially reduced data frames. In either case, the root node can complete the reduction, incorporating its own contribution. The final result of the reduction can then be sent down the multicast tree to leaf nodes. The result frame can carry another round of reduction arming instruction, which can then re-arm the reduction engines at the same time.

Figure 2:
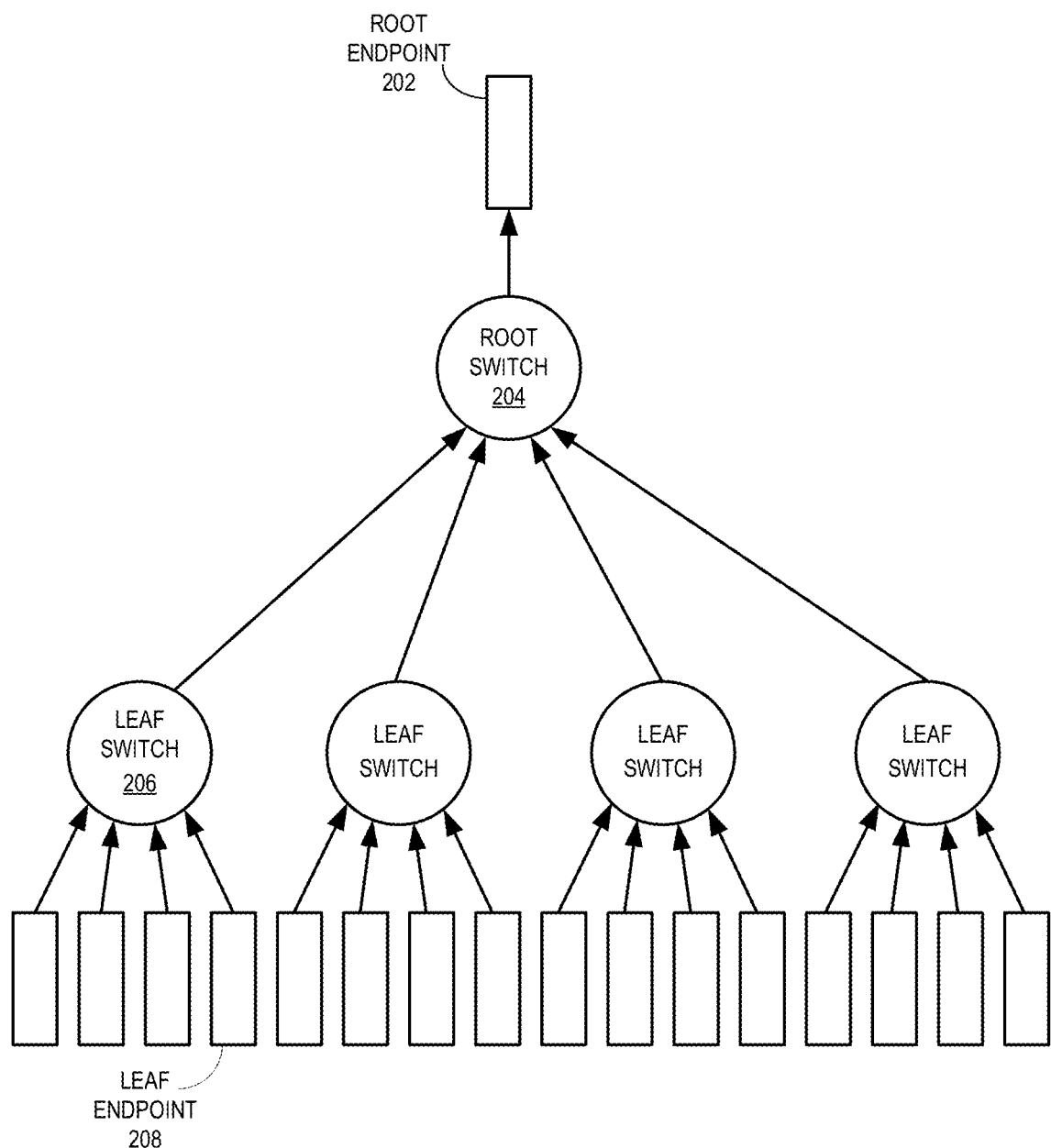
FIG. 2 shows an exemplary multicast tree for a reduction process.

The reduction engine can reduce latency in critical network operations including reduce, all-reduce, and barrier. Reduction operations can be performed over a spanning tree embedded within the network. FIG. 2 shows an exemplary multicast tree for a reduction process. In this example, a multicast tree for the reduction process can include a root endpoint 202, a root switch 204, a number of leaf switches such as leaf switch 206, and a number of leaf endpoints such as endpoint 208. Root switch 204 is responsible for initiating the multicast tree for the reduction process. Each switch can include a reduction engine that can be armed when the multicast session is setup. The leaf endpoints can inject frames, which can be combined as they flow up the tree, with the result being delivered to a process running at the root of the tree. As described below, the root process may need to complete the reduction in software. This is the ready phase of a reduction. The result of a reduction can be then multicast back down the tree to processes at the leaf endpoints and the reduction engines can be re-armed, ready for the next round reduction. This is the multicast phase of a reduction process.

The multicast phase of a reduction process can provide synchronization for a barrier operation, during which no data is required and a null reduction operation is used. Each node can join the reduction tree and wait for the result. When the root node receives the result, it can then issue a multicast down the reduction tree. In one embodiment, no endpoint is allowed to leave the barrier before all endpoints have entered.

Reduction engines can be provided on the output side of each link. They can operate on data held in the reduction buffers. In one embodiment, each reduction engine can support eight active reduction trees. Other numbers of reduction trees can also be supported. The reduction engines can perform on-the-fly combining of data frames. The reduction engines are armed during the multicast phase. They can combine upstream frames for a given amount of time. The reduction engine can be disarmed either when the current operation has been completed, or after a timeout period. In the event of a reduction timing out, any partial results can be forwarded up the tree towards the root. The purpose of the timeout is to ensure that no reduction state remains in the event of error, device failure, or frame loss within the reduction tree.

Figure 3A:
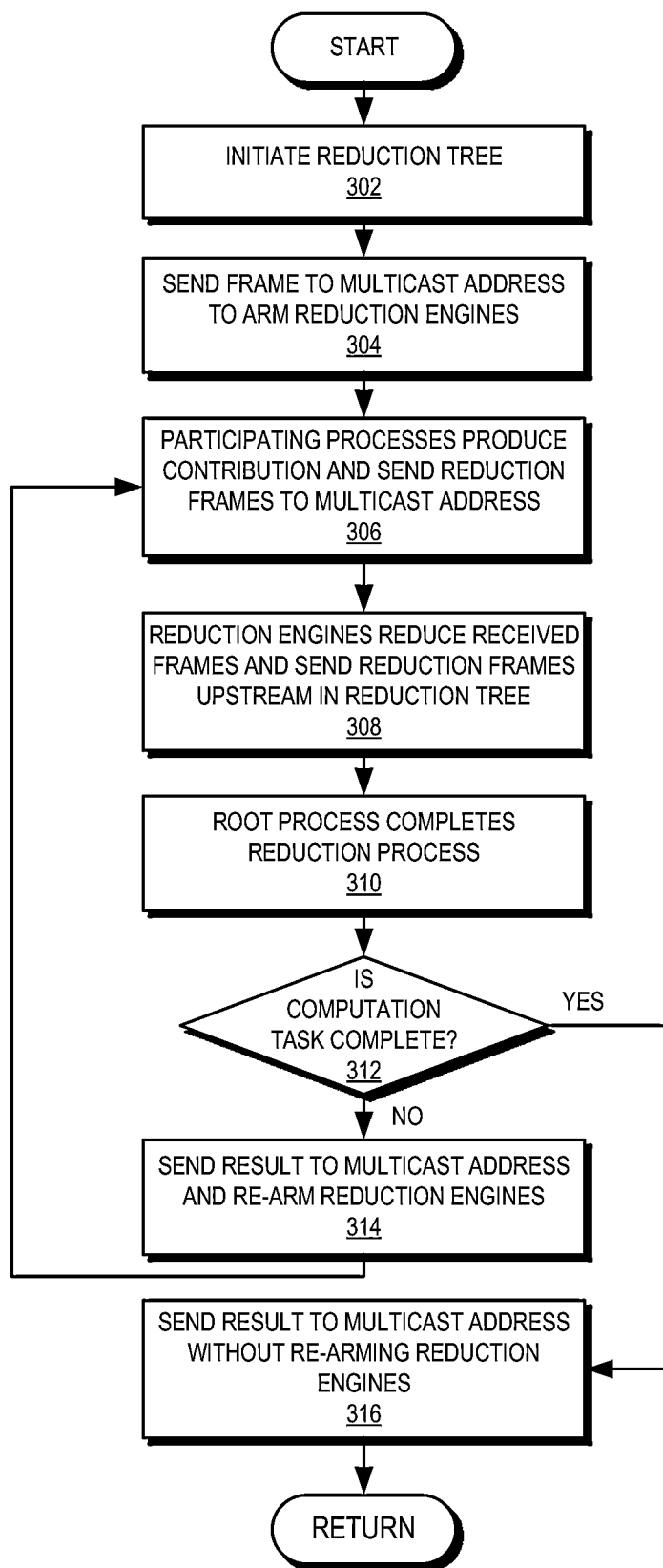
FIG. 3A shows a flow chart of an exemplary reduction process.

FIG. 3A shows a flow chart of an exemplary reduction process. During operation, a root process first initializes the reduction tree (operation 302). In HPC programming models, initialization can be a collective operation involving a number of processes that are to participate in a reduction. One process, which in this case can be the root process, can communicate with the network management software to create a spanning tree (the multicast tree), which can be represented by a multicast address. The network can use a multicast protocol to establish the multicast tree topology, and store the forwarding information in a data structure, such as a multicast table. This data structure typically stores topological and forwarding information, such as for a given multicast address, what output ports should a multicast packet be forwarded to. The root process can then arm the reduction engines in the spanning tree by sending a frame to the multicast address (operation 304). Other processes can wait until they receive this frame. Once this frame has reached all the participating processes, the reduction tree is now ready for use.

Subsequently, the participating processes can perform the computation task that results in their contribution to the reduction operation. Processes other than the root process can each construct a reduction frame and send it to the multicast address of the reduction tree (operation 306). The reduction engines residing in the switches participating in the reduction tree can perform reduction on the received frames and each send a reduced frame upstream toward the rood switch of the reduction tree (operation 308). The root process can consume the data reduction frames. It can receive the contributions from the leaf nodes in one or more data reduction frames and complete the ready phase by performing the reduction operation to these frames, including its own contribution (operation 310). Optionally, the root process can then determine whether the computation task is complete (operation 312). If it complete, the root process can send the result to the multicast address and release the reduction engines (operation 316). If the computation task is not complete, the root process subsequently constructs a reduction frame containing the result and sends it to the multicast address, which in turn can re-arm all the reduction engines in the reduction tree (operation 314). This operation can prepare the reduction engines for the next round of reduction. A similar reduction process can then be repeated until the computation task is complete.

The root node, or more generally a process on the root node, can perform a special role. It first completes the reduction process. As described later, loops are usually not allowed in the multicast tree; hence the root typically does not send its own contribution to itself. Assuming that the reduction engine at the root node of the reduction tree is able to accumulate all of the contributions from the leaf nodes before timing out, the root node can receive a single data reduction frame from the leaf nodes. In this case, the root node can combine this result with its own contribution. On the other hand, if the reduction engine at the root node times out or cannot be allocated, the root node may receive a number of data reduction frames that are to be combined in software. Once the root node has computed the final reduction, it can multicast this result to the leaf nodes. The root process can also have additional responsibilities in terms of handling errors.

Figure 3B:
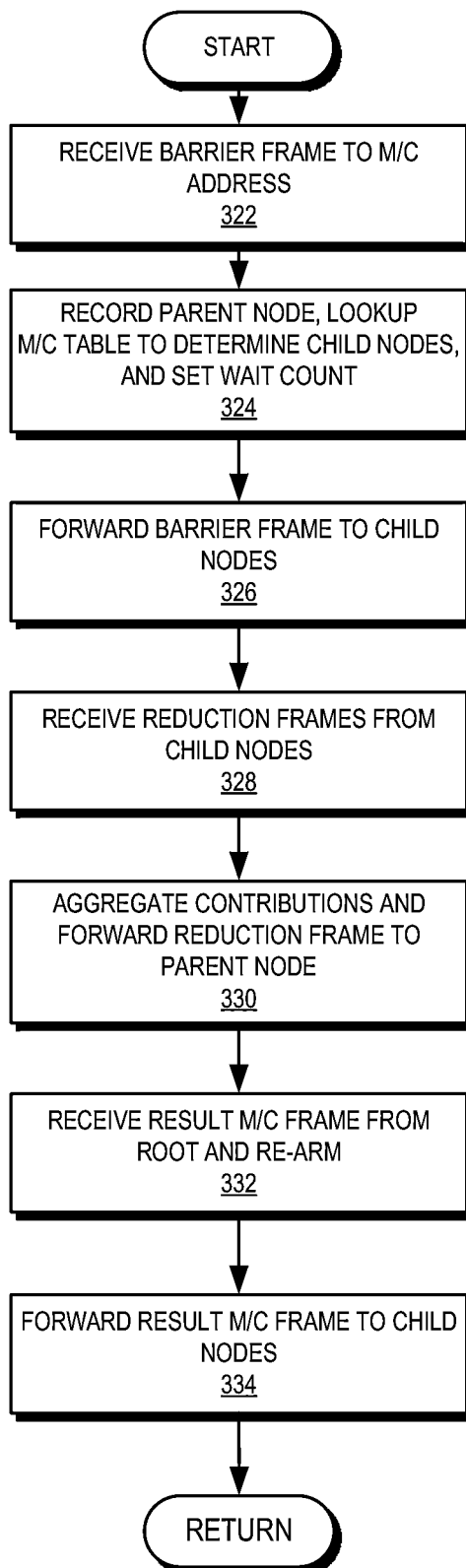
FIG. 3B shows a flow chart of an exemplary reduction operation by a reduction engine.

FIG. 3B shows a flow chart of an exemplary reduction operation by a reduction engine. During operation, a reduction engine residing on a switch can first receive a barrier frame sent to the multicast address (operation 322). Note that the barrier frame is the initial frame that is used to arm the reduction engines for a reduction tree for the first time. After receiving the barrier frame, the reduction engine can record the parent node (i.e., the switch from which the barrier frame is received), and perform a lookup in the multicast table to determine the downstream node to which the barrier is to be forwarded (operation 324). In addition, the reduction engine also sets a wait count, which corresponds to the number of contributions that are expected to be received from the endpoints based on the multicast table entry.

Subsequently, the reduction engine forwards the barrier frame to the child nodes (operation 326). As the barrier frame travels down the reduction tree, all the reduction engines participating in this reduction tree are armed. As a result, the reduction engine at the local switch begins to receive reduction frames returned from the child nodes or endpoints (operation 328). Next, the reduction engine can aggregate the contributions and forward a reduction frame to the parent node (operation 330). At this point, the reduction engine is now ready for reduction operation. Next, the reduction engine can receive a result frame from the root node, which arms all the reduction engines for a reduction operation which involves actual data.

The examples shown in this description assume that one process per node contributes to the reduction, which is not required. There can be multiple contributions per node. In some embodiments, a local shared memory reduction and a network reduction can both be performed. Furthermore, the reduction engine described herein can support multiple concurrent non-blocking reduction operations on the same reduction tree.

The computational operations supported by a reduction engine can include, but are not limited to:
  Null (i.e., the barrier operation which does not involve any payload data);
  MIN, MAX, and SUM operations on integer or floating point data types;
  MINMAXLOC operation (which returns the locations of minimum and maximum values found in an array) on integer or floating point values and integer indices;
  Bitwise AND, OR, and XOR operation on integer data types;
  Reproducible sum operations on floating point data types.

The data types supported by a reduction engine can include, but are not limited to 64-bit integer and 64-bit IEEE 754 floating point.

In one embodiment, the MINMAXLOC operator can follow Message Passing Interface (MPI) conventions for MINLOC and MAXLOC operators when the values being compared are equal. In one embodiment, the lower of the two index values is returned.

For compatibility with a commonly used modern instruction set, rounding modes and exception behavior can follow the definitions in the Advanced RISC Machine (ARM) Architecture Reference Manual, ARMvS. For example, if any operand of a floating point operation is not a number (NaN), the result can be a quiet NaN with its sign=0.

The reproducible sum and MINMAXLOC operators can use one operand per endpoint. Other reductions can be performed on four 64-bit operands at a time with the same operation being applied to each of the operands.

The sum of a set of IEEE floating point values may depend on the order in which the operands are added. This can be an important issue when a reduction includes operands of widely varying magnitudes. The publication "Efficient Reproducible Floating Point Reduction Operations on Large Scale Systems," available at https://bebop.cs-.berkeley.edu/reproblas/docs/talks/SIAM_AN13.pdf describes one technique that can be used to achieve the desired level of precision for a given number of elements.

A deterministic reduction can be performed using a global maximum followed by a global sum using standard floating point arithmetic. A single global sum using integer arithmetic can also be used. With the second approach to reduction, the host software is to perform the same operation when multiple contributions are delivered to the root node.

In general, each reduction engine can support multiple, independent reduction trees, each identified by a globally unique multicast address. Each point in the tree can be initialized with a local wait count value denoted as rt_waitcount. This count value is normally equal to the number of endpoints beneath that stage of the tree (i.e., the number of children nodes of a given node in the tree).

Reduction trees can be initialized by creating an entry in a multicast table which specifies the wait count and the set of output ports. This static state, which varies between locations in the tree, can be initialized by the management software in the same way as a multicast tree.

A single multicast address can be used for each reduction tree. At a parent port, the multicast table entry can specify the set of child ports. At each of the child ports, the multicast table entry can specify the parent port, i.e., the reverse path pointing back towards the root node. In general, loops are not allowed within a reduction tree. Unlike typical multicast entries, where any member of the multicast group is able to multicast to all other members of the multicast group, the multicast entries set up for reduction are one-sided and only the reduction root is able to multicast to all members of the multicast set. When any other member of the reduction tree sends a frame to the multicast address, this frame is only forwarded back to root node of the reduction tree. In addition, the forwarding of this frame typically follows exactly the reverse of the downstream multicast path from the root node. This forwarding mechanism guarantees reduction frames can be correctly intercepted by the reduction engines that have been set up for them.

In one embodiment, one or more fields in a frame's header can be used as a protection key to ensure that all contributors to a given reduction are from the same application or service. For example, a virtual network identifier (VNI) field from the frame header can be used as a protection key. In addition, a frame's reduction header can contain a 32-bit cookie. All frames in a reduction can be required to have the same protection key and cookie as the frame used to arm all the reduction engines in the same reduction tree.

As mentioned above, reduction trees are armed before they can be used. A multicast session can be used to arm the tree. In a global reduction process, the multicast phase that distributes the result of a reduction can re-arm the tree. In one embodiment, a reduction_arm request can include the state that is constant for all points in the reduction tree. Reduction operations on a given tree can be identified by their multicast address, a cookie rt_cookie, and a sequence number rt_seqno. All contributors can be required to provide the same protection key (which can be the VNI value), cookie value, and the correct sequence number. The reduction engine can confirm that these conditions are met. The cookie value can be used to help prevent accidental or malicious interference in the reduction. It may be a random value generated by the root process.

The process of arming a reduction tree can create a dynamic state in the reduction engines for a given tree. The wait count value can be copied from the multicast table, which indicates the number of output ports for a given multicast address. A timeout value can be determined by comparing the value of the rt_waitcount value with values programmed by the management software. The protection key, cookie value, and the sequence number can be copied from the multicast frame. A local counter rt_count, which tracks the number of received reduction frames, can be initialized to zero.

All contributions to a given reduction can specify the same reduction operation, which can be identified by an rt_op value. The reduction hardware can generate an error if frames with the same sequence number specify different operations.

Partial result frames can include a count of the accumulated number of contributions. The leaf endpoints can inject frames with a count of one. The reduction engine can increment the local counter by the partial counts from each frame as it performs the reduction operation. The reduction operation is complete in a given reduction engine when the local count reaches the wait count. On completion of a reduction or expiry of the timeout, the reduction engine forwards the partial result and frees up the dynamic state for the reduction tree. The static state remains in the multicast table until the multicast table entry is deleted. The reduction tree must be rearmed before it can be used again.

The result of the reduction is completed by a process at the root node. In a global reduction the result can be distributed to the leaf nodes using a multicast down the reduction tree. This operation can also re-arm the tree. In one embodiment, the system can supply both the sequence number for the result being distributed, rt_resno, and the sequence number for the reduction being armed, rt_seqno. A management software can increment the sequence number from one reduction to the next. In normal operation, rt_seqno is typically one higher than rt_resno modulo the size of the counter, which may not be the case in the event of error. For upstream reduction data frames, rt_resno does not need to be set by the management software and hence can be ignored by the hardware. The reduction engine can set rt_resno equal to rt_seqno when sending frames upstream.

In the example shown in FIG. 2, the reduction tree has a branching ratio of four. Endpoints such as leaf endpoint 208 supply their contributions with a count of one. Each first stage switch in this example, such as switch 206, has a wait count of four, which corresponds to the four leaf endpoints connected to each leaf switch. These switches can combine frames from their four children. Partial result frames with a contribution count of four are forwarded up the tree to the second stage switch, which in this example is switch 204. Switch 204 can have a wait count of 16. This second stage switch then applies the reduction operator to four frames (one from each of its children) and forwards a result frame with count 16 to root endpoint 202. In practice, the multicast tree may not be completely balanced, where some leaf nodes can have different contribution counts than others, and some later-stage switches can have different contribution counts from other switches at the same level.

Note that the reduction engine in each switch can accelerate a component of the reduction, which may not always be necessary for proper functionality. A reduction arm command may be unable to allocate a descriptor because perhaps all of the descriptors are busy, or a reduction descriptor may have timed out before all of the results are received. In either case, data frames for this reduction may fail to find a matching descriptor and then be forwarded along the multicast path. A reduction engine in a switch higher in the multicast tree may reduce these frames or they may reach the root where they can be reduced in software.

In general, a single barrier or reduction operation proceeds with each node other than the root node providing a contribution and then waiting for a result to be returned from the root node. The root node gathers contributions, completes the reduction, and multicasts the result. The sequence number is incremented from one such reduction to the next. It may be desirable to pipeline multiple reductions over the same set of nodes at the same time, for example, to offload progression of non-blocking reductions or to increase bandwidth on multi-element floating point reductions. Software can perform multiple concurrent reductions on the same tree by distinguishing such reductions using high bits of the multicast address. For example, bits 15-3 of the multicast format Destination Fabric Address (DFA), which in one embodiment is used as an inter-switch address for routing traffic within a switch fabric, can distinguish 8K multicast trees. Bits 20-18 of the same multicast address can then be used to distinguish up to 8 reductions being performed concurrently on the same tree. When a reduction engine forms part of more than one reduction tree, probability of contention can increase when multiple reductions are performed concurrently. As a result, more of the reduction operations may be performed higher in the tree.

In one embodiment, a reduction engine can use a timer to limit the amount of time it spends waiting for contributions. As a result, reduction operations may time out. On expiry of the timer, the partial result of a reduction can be sent up the tree towards the root endpoint. Any further data frames associated with a reduction that has timed out can also be sent up the tree.

Figure 4:
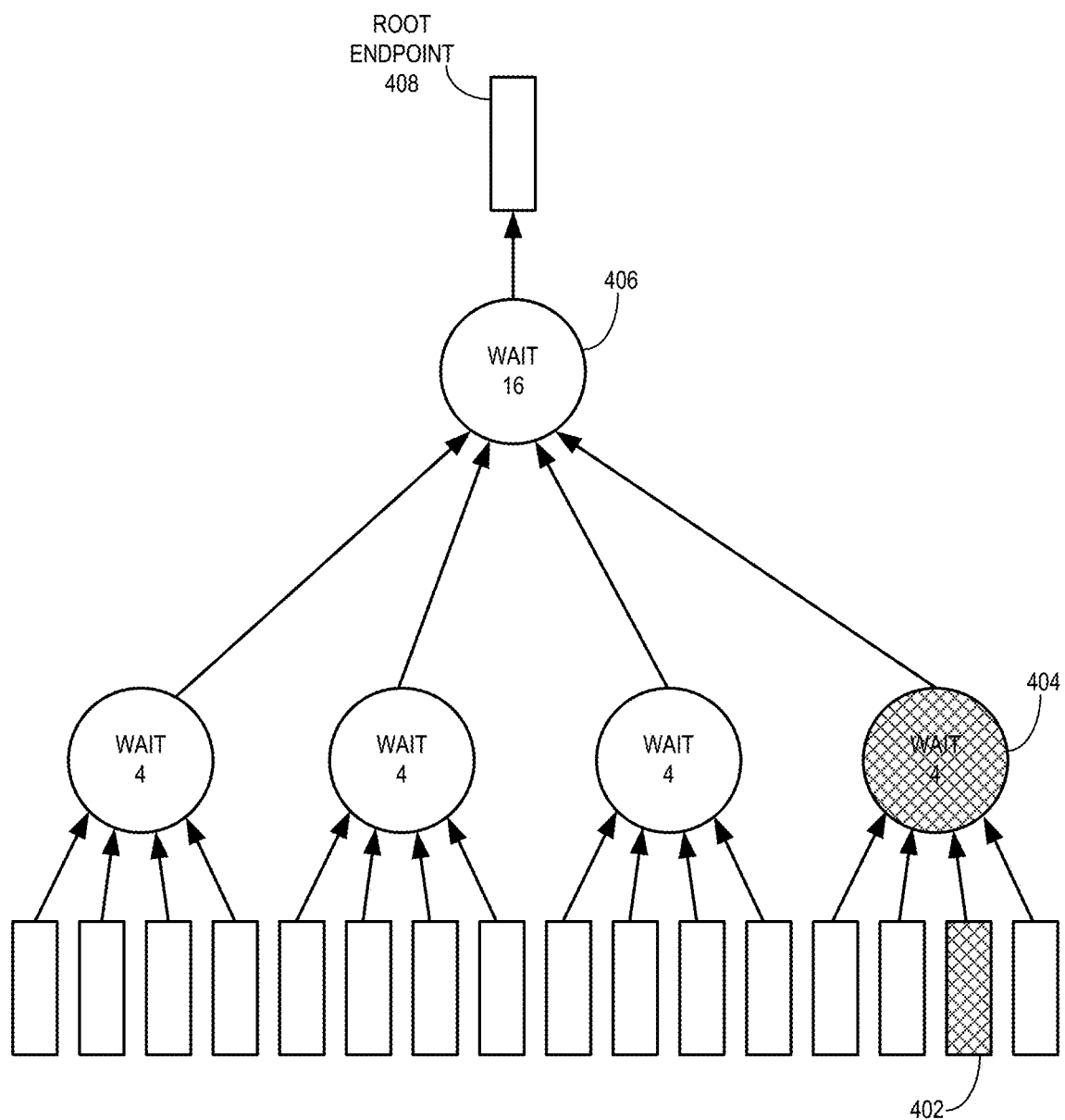
FIG. 4 shows an example where one leaf endpoint is late joining the reduction process.

FIG. 4 shows an example where one leaf endpoint 402 (shown in gray) is late joining the reduction process. All the rest leaf endpoints send packets with a count of one. One of the first stage switches, switch 404 (shown in gray) has received frames from three of its children when the timeout expires. It can then forward a result frame with a count of three up the tree. Sometime later, endpoint 402 supplies its contribution to the reduction. This frame is forwarded up the tree. In this example, second stage switch 406 accumulates five frames, three with counts of four, one with a count of three (from switch 404), and the late frame with a count of one from endpoint 402. Switch 406 subsequently sends its result to root endpoint 408 with a count of 16. In one embodiment, second stage switch 406 can have a longer timeout period to accommodate the late arrival. If all switches had the same timeout values, second stage switch 406 may forward two frames to root endpoint 408, one with a count of 15 and the late frame from endpoint 402 with a count of one. The root endpoint can then complete the reduction.

In one embodiment, the value for a reduction timeout can be set based on the expected time between reduction operations plus twice the expected variation in arrival time. High timeout values (seconds) do not alter the error free operation, but may delay the arrival of the partial results in the event of error. High timeout values can also cause reduction engine resources to be tied up for longer in the case of a dropped frame or the delayed arrival of a partial result. On the other hand, low timeout values may cause problems with scalability.

The purpose of the reduction engine is to accelerate latency-sensitive operations, e.g., those in which all processes arrive at a reduction or barrier at approximately the same time. Where there is significant load imbalance and one or more endpoints arrive late, the root node can receive multiple frames. The root node can complete the reduction quickly as the last frame arrives. If the timeout is set correctly (or conservatively), the time spent processing these frames can be small in comparison with the time spent waiting.

In some systems, such as Exascale systems, errors such as frame drops are usually expected to occur. The reduction mechanism can be designed to still function well in the presence of errors. Two classes of error can be of importance for reduction operations: link errors that cause frames to be corrupted and device errors that cause frames to be dropped. Where available, link level retry can protect against common link errors; therefore, the dominant error case can be expected to be dropped frames arising from a switch or cable failure. Where forward error correction (FEC) is used without link level retry, a small proportion of link errors can result in frame drops. Most such frame drops can occur on bulk data transfer rather than reductions. However, the likelihood of an error causing reduction frames to be lost can increase with the job size.

The time required to detect errors in reduction operations arising from frame loss can generally be counted in seconds. Under normal operation, this period can be set to be longer than the expected spread of arrival times or the time that nodes might spend in computation while waiting for a non-blocking reduction to complete. After this period, the root process can reasonably be assumed to be blocked waiting for the reduction to complete. However, there are many examples where processes wait for long periods of time in reduction or barrier operations while other processes complete sequential work. A long time spent in a reduction does not always imply that an error has occurred.

Figure 5A:
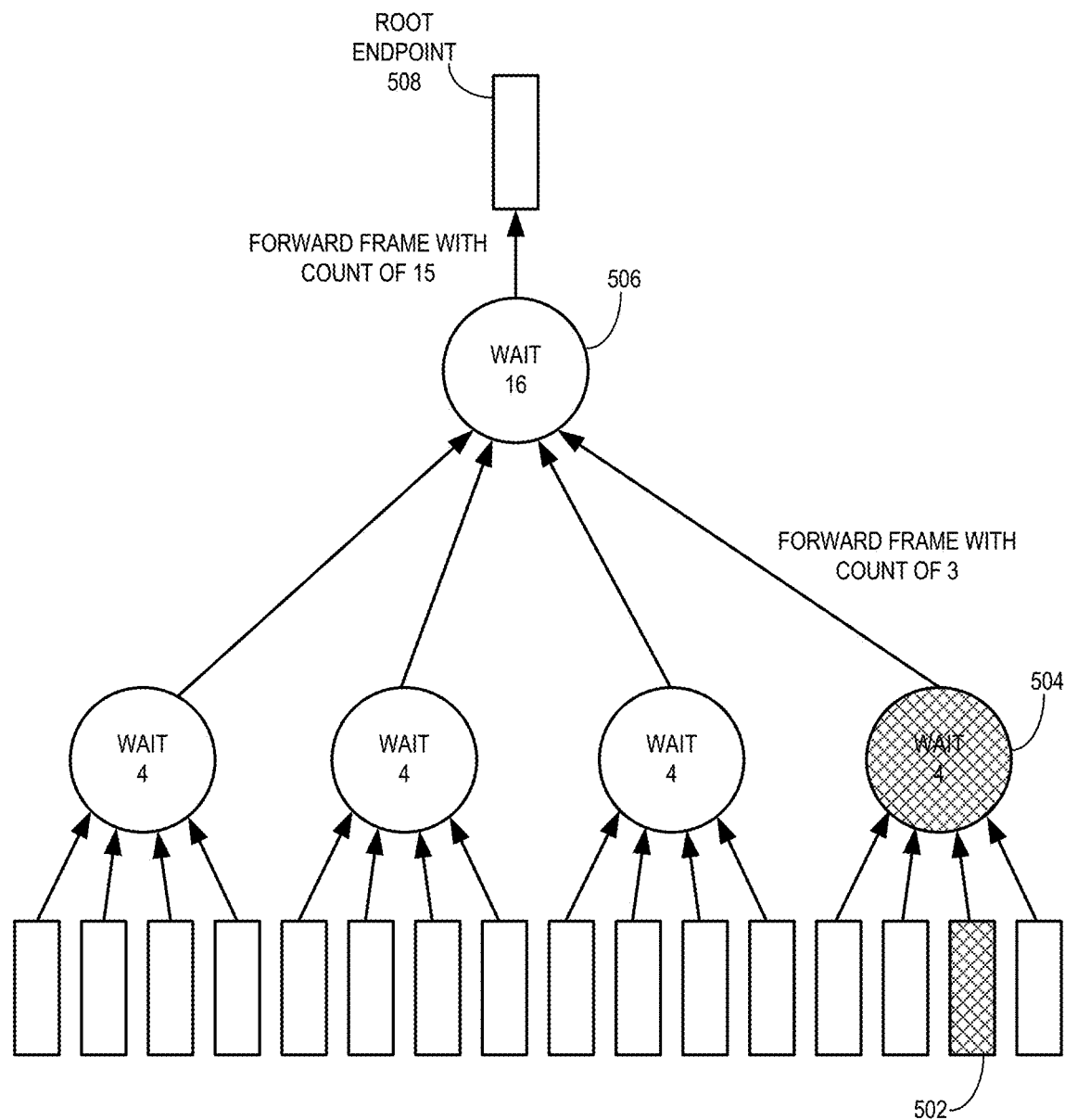
FIG. 5A shows an example where one leaf endpoint fails to supply a contribution because of an error.

FIG. 5A shows an example where one leaf endpoint fails to supply a contribution because of an error. In this example, leaf endpoint 502 experiences an error and does not supply its contribution to the reduction process. As a result, intermediate switch 504 times out and forwards a partial result with a count of three. Root switch 506 again times out (because a total count of 16 is not received before switch 506's timer expires) and forwards a frame with a count of 15, or perhaps a frame with a count of 12 and a second, subsequent frame with a count of three. In either case, root endpoint 508 then consumes the frame(s) and determines that there has been an error.

Figure 5B:
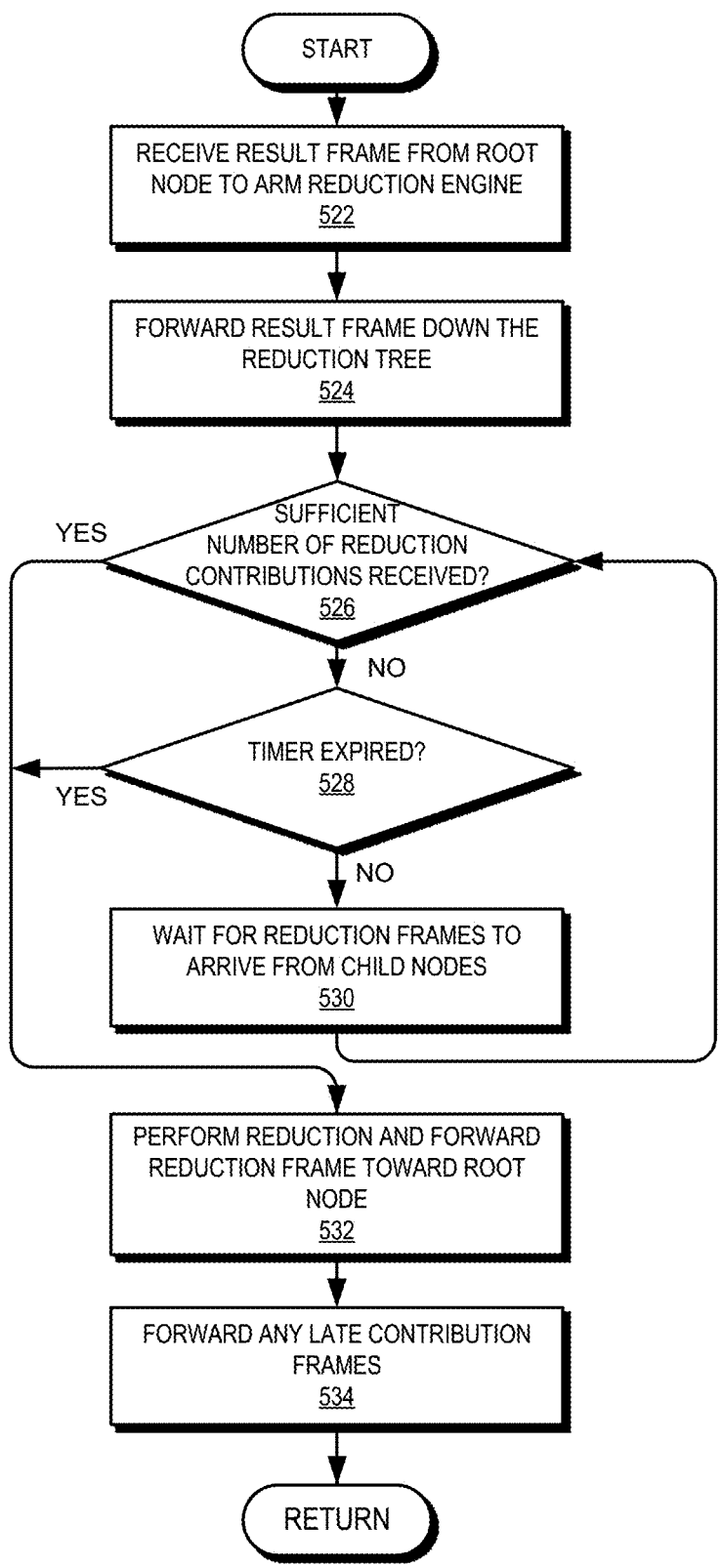
FIG. 5B shows a flow chart of an exemplary timer-based reduction process.

FIG. 5B shows a flow chart of an exemplary timer-based reduction process. In this example, a reduction engine first receives a result frame from the root node, which arms the reduction engine (operation 522). The reduction engine then becomes armed for the reduction tree identified in the result frame, and forwards the result frame to its child nodes in the reduction tree (operation 524). Next, the reduction engine determines whether a sufficient number of reduction contributions have been received (operation 526). This determination is based on the corresponding wait count, which has been set up during the ready phase when the reduction tree is initiated for the first time. If the wait count has been met, the reduction engine then performs the reduction operation on the received contributions, generates its own reduction frame, and forwards the reduction frame toward the root (operation 532). If the wait count is not satisfied, the reduction engine further determines whether the timer has expired (operation 528). If the timer has not expired, the reduction engine continues to wait for reduction frames to arrive from child nodes (operation 530). If the timer has expired, the reduction engine then performs reduction operation on the received reduction contributions, if any, and forwards its own reduction frame toward the root node (operation 532). If there are any late contribution frames that arrive after the timer expires, the reduction engine can also forward them toward the root node (operation 534).

In one embodiment, reliable reductions can be implemented at the transport layer. The network hardware can be designed to accelerate the common case and to free all hardware resources in the case of error. Software can protect against device failure in the reduction tree by performing the same reduction operation over two independent trees. The probability of uncorrelated double error is small. When the root endpoint receives a result (or sufficient frames to construct the result) from one tree the host software can multicast the result on both trees. The sequence number from the successful operation can be used as the result number.

In the case where the second tree is left with a partial result, potentially several steps back, or stranded on a congested link or a busy queue, delivery of the reduction multicast frame with the rt_arm bit set can advance the sequence number and clear the state. Frames with an old sequence number can be dropped. One or more frames may still be in flight up the tree.

Reductions are typically latency sensitive, and not bandwidth intensive. The additional network load created by performing two simultaneous reductions is usually negligible. An added benefit of performing reductions twice, on distinct trees, is that the first result can be used, potentially reducing the time to complete the operation if the network is congested. The drawback to this approach, however, is that twice as many Reduction resources (e.g., multicast table entries and reduction engines/IDs) are used, potentially reducing the number of simultaneous reductions by a factor of two.

A correlated double error may arise as a result of chassis power failure, but such an error may likely cause node failures as well. In a multi-slice network, software can create reductions trees on different slices. Where there is only a single network slice, trees on the same slice can share a common-chassis switch. The reduction is vulnerable to loss of this switch, but such an error can disconnect the nodes as well.

Allowing reductions to time out ensures that no reduction state is left behind in the event of error. There does not need to be requirement to issue management requests to search and release hardware resources after a fault. In some embodiments, reduction state can be left in the network in the event of error and fault recovery can be complex.

Figure 6:
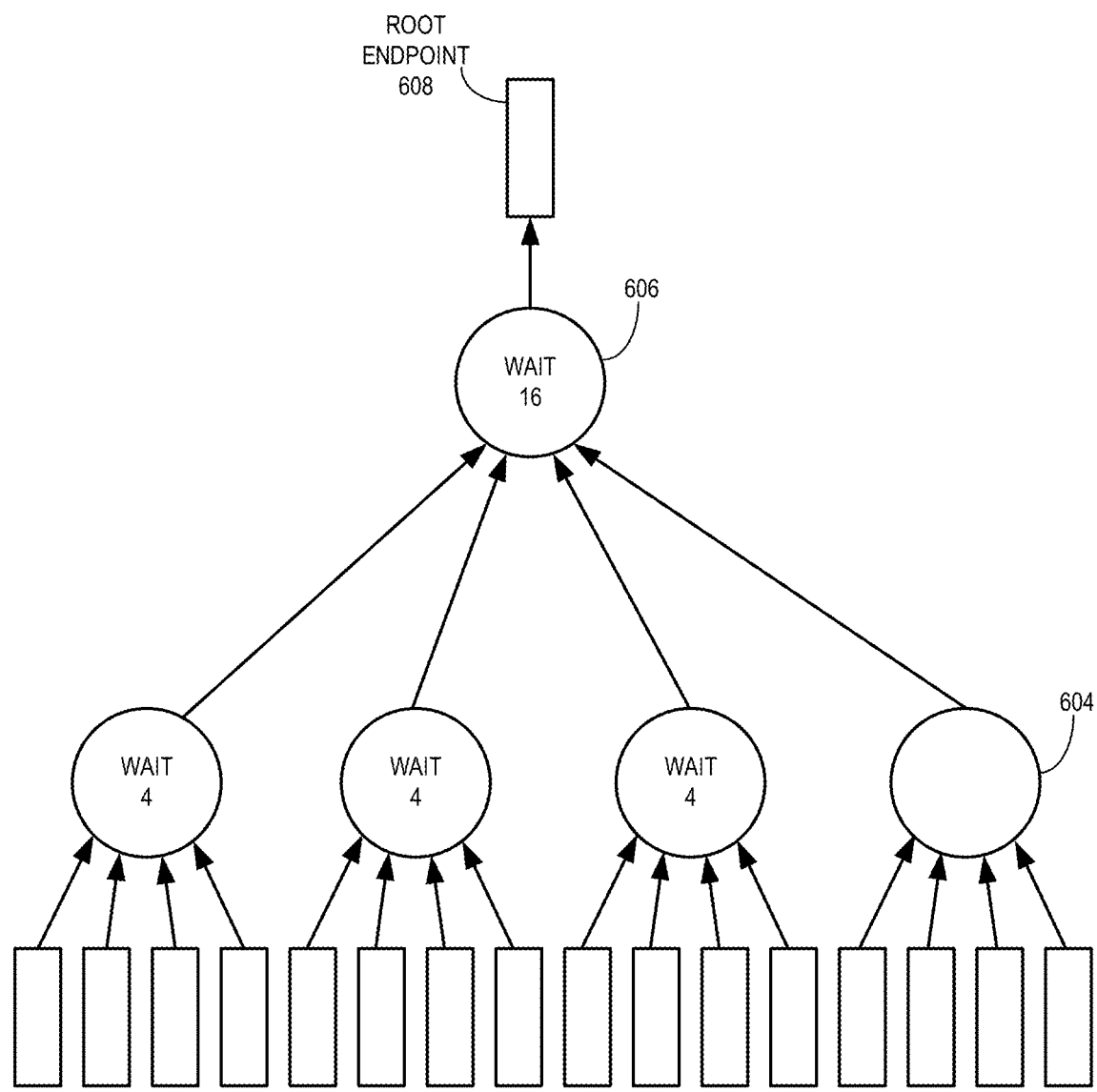
FIG. 6 shows an example where a reduction engine on a leaf switch is unavailable.

In some embodiments, a flexible reduction protocol can be provided where a missing reduction engine, or one where all resources have been consumed, does not render the protocol dysfunctional. A missing early leaf reduction computation can be completed by a reduction engine higher in the tree, as shown in FIG. 6. In this example, the reduction engine on a leaf switch 604 is unavailable for the reduction process. As a result, leaf switch 604 forwards all four contribution frames generated by the four children leaf endpoints to a root switch 606. Meanwhile, other three leaf switches 601, 602, and 603 each send their respective reduction frame (with a count of four) to root switch 606. Root switch can process all these seven frames and forwards a single reduction frame with a count of 16 to root endpoint 608. In general, a reduction computation high in the tree can be completed by a process running on the root node. The acceleration offered by the reduction engines in those cases may be different but the calculated result remains the same.

If a reduction tree is armed, but no contributions are provided before all of the active reduction engines time out, then all contributions can be forwarded to the root endpoint. The root process can subsequently perform the entire computation. The time required to perform this computation can be much shorter than the timeout period. This reduction scenario does not require acceleration.

The maximum number of reduction trees that can be supported on a given system can be determined by the product of the number of endpoints that can act as root and the number of active trees supported by a given reduction engine. There is usually limited value in accelerating reductions over small numbers of nodes, because each node can simply send its contribution to the root node. Suppose the goal is to accelerate reductions of sixteen nodes and above. A system might run a thousand or more such jobs, while large systems tend to run a mix of job sizes, which in turn may reduce the number of active reduction trees. A large application might use multiple reduction trees at the same time. In the canonical example, the processes can be arranged in a 2D mesh and reductions are performed over the rows, the columns, and over the entire mesh. For P processes, the number of active reductions can be twice the square root of P plus one. For implementation considerations, the multicast table is relatively expensive in terms of die area. In one embodiment, a switch chip can support 8192 multicast addresses, while other numbers are also possible. Note that non-intersecting trees may use the same multicast address.

In some embodiments, software can decide which reductions to offload. A request can be sent to the network management system to create a reduction tree. If this request fails the network application interface (API) can perform the operation in software. However, running different instances of the same job with software-based reductions or accelerated reductions can potentially lead to performance variation, which is undesirable. The reduction offload strategy can be configured such that running out of reduction trees is unlikely.

In one embodiment, a 6-bit command field is used to indicate different reduction operations, as shown in FIG. 7. This 6-bit command field can provide scope for expansion if needed. Multiple concurrent reductions may operate on the same tree. Each reduction can use a different reduction ID in the DFA. The wait count can be set to be sufficient for one contribution per node in a maximally sized system. In one embodiment, the wait count can be a 20-bits value.

In addition, four configurable timeout values can be provided. These 24-bit values can be given in units of 1024 clock cycles. At 850 MHz, this provides a range from 1.20 us to 20.2 s. In addition, a 10-bit sequence number can be used, which can avoid being reused while an old reduction frame with the same multicast address and the same cookie value is still in the network. Note that this problem does not occur on the same reduction tree, because in-order delivery prevents an old reduction frame from being delivered after frames transmitted later on the same tree. Therefore, for a late-arriving frame to cause a problem, the process it belongs to needs to exit first so that a newly launched process could request a new multicast tree, which can be built using the same multicast address. The chance that the old reduction frame survives the reprogramming of the multicast table is low. If it did survive, it still needs to intersect the new tree after the new tree performs 1024 reductions. Note that the 32-bit cookie value can also provide an extra layer of protection.

FIG. 7 shows an exemplary list of reduction operations, which are explained below. The FLT_REP SUM and the MINMAXLOC operations support one reduction at a time per tree. For all other operations, four reductions per tree can be performed in parallel. The floating point sum operations can have four rounding modes and flush-to-zero (FTZ), which can be encoded in three bits as eight different commands. Floating point MIN and MAX have two modes for handling NaNs (mirroring the ARM MIN and MINNUM operations). FTZ only applies to denormalized results. If a result is to be denormalized, it is set to 0 instead and flt_inexact is raised. The operation sometimes known as denormal as zero (DAZ) may be supported in software at the leaf nodes.

BARRIER: The data returned by BARRIER operations is always 0.

MINMAXLOC: The MINMAXLOC operators are used to support the MINLOC and MAXLOC. Operands 0 and 1 compute MINLOC, and operands 2 and 3 compute MAXLOC. FIG. 8 shows a set of MINMAXLOC operands. Note that when more than one index contains the minimum/maximum value, the lowest such index is recorded in the MINLOC/MAXLOC field.

FLT MIN and FLT MAX: When all inputs of FLT_MIN or FLT_MAX are floating point numbers, the minimum or maximum value is returned. When any operand of FLT_MIN or FLT_MAX is a NaN, NaN is returned. In a given pairwise reduction, if one operand is a signaling NaN and one operand is a quiet NaN, the signaling NaN is selected to be returned. The NaN returned can be turned into a quiet NaN with its sign bit cleared.

FLT MINNUM and FLT MAXNUM: These operations are similar to FLT_MIN and FLT_MAX but handle operands that are NaNs differently. In the absence of a signaling NaN, FLT MINNUM and FLT MAXNUM can return the smallest/largest numbers in the reduction. A quiet NaN is only returned when all of the operands in one of these reductions are quiet NaNs.

The behavior of signaling NaNs with regard to these operators can be controlled by a R_TF RED_CFG_MODE register. In standard IEEE mode, a signaling NaN (SNaN) as an operand of a pairwise reduction always produces a quiet NaN as a result. This produces indeterminate results for the complete reduction. In the recommended associative mode, when one operand is SNaN and the other is a number, the result is the number. Thus, in associative mode, if at least one operand in the reduction is a floating point number, the minimum or maximum floating point operand is returned. In either mode, if any operand is a signaling NaN, flt invalid is returned.

FLT_MINMAXNUMLOC: This operation computes both FLT_MINNUM and FLT_MAXNUM.

FLT_SUM: This floating point sum operation has a flush-to-zero option and four rounding modes. When flush-to-zero is enabled, if the sum is denormalized, it is set to 0. The sign of the denormalized result is preserved. The four rounding modes match the ARM rounding modes and are shown in FIG. 9.

FLT_REPSUM: The reproducible floating point sum is accomplished by splitting each floating point operand into up to four integer components, each of which has limited precision. The number of significant bits (W) in each component is selected such that integer overflow cannot occur. The value of W is selected by software and is not observable in the hardware. W is used to compute the integer values IX to load into the reduction operand rt_data. When the reduction is complete, W is used to construct the floating point result. The software may choose to set W to 40; in this case, up to 2^24 operands may be reduced. A floating point number can be represented by up to four W-bit integers as follows: $\Sigma_{j=M}^{M+4} IX[j-M] \times 2^{W \times j}$.

For each floating point operand, the software chooses the largest value of M such that the least significant bit of the operand appears in IX[0]. Software is responsible for loading the four IX values into rt_data and the value of M in rt_repsum_m, which is an eight-bit signed integer. IX[0], the least significant operand, is loaded into rt_data[0].

When two operands in this format are added by the reduction engine, if one operand's M, M', is larger than the other, the hardware can discard any IX[j-M] in the smaller operand where j<M' because these values may not have significance in the final result. If this occurs during the course of the reduction and any nonzero operands are dropped, repsum_inexact can be returned.

When the reduction is complete, the root process can convert the resulting operands and rt_repsum_m into a floating point number. If there are more operands than are supported by the chosen W, int_overflow may be returned. In this case, the result is not valid. Note that int_overflow is only reported if the overflow occurs in one of the significant values returned in the result. The rt_repsum_oflow_id identifies the most significant operand to overflow. When a partial result with int_overflow is reduced with another partial result, if (M+rt_repsum_oflow_id) of the overflow partial result is less than M' of the other partial result, the int_overflow result code is dropped.

In some embodiments, static state for reduction operations can be programmed in the multicast table. This state can vary between devices in the same reduction tree. The state can be created by the management agent when a job starts or a new reduction tree is created. It can use the same mechanism as is used for setting up standard multicast entries. The multicast reduction trees are distinguished from multicast trees by a non-zero wait count. The timeout value for a reduction in a particular reduction engine can be determined by its wait count value and the configuration.

The reduction frame format is the same for reduction_arm and reduction_data frames. They can be distinguished by the rt_arm field which can be set on all frames descending the tree. The 84-byte Portals-formatted reduction frame is shown in FIG. 10.

The Portals header and command fields are stored once in the reduction state. The 12-byte reduction header is shown in FIG. 11. The endianness of the operands, which is used for the MINMAXLOC reproducible sum operators, is shown in in FIG. 12.

Errors or inexact results encountered during the course of a reduction are reported in rt_rc. In general, these events do not prevent the reduction from completing. However, in the event of an opcode mismatch, the reduction cannot be performed. In this case, the Source Fabric Addresses (SFA) of two operands with differing opcodes are returned in rt_data[0]. The reduction result codes are summarized in FIG. 13.

There is only one result code shared by the four parallel reductions. Result codes are defined in priority order. If a reduction encounters more than one exception condition, the largest is retained. For example, flt_invalid is the highest priority FLT_SUM result code.

In some embodiments, the reduction engine can be utilized from an Ethernet NIC which is generally not equipped to operate with the HPC Ethernet specification and utilize the Portals packet format. To facilitate reduction using reduction engines, the system can use the Soft Portals encapsulation, in which the Portals packet can be prepended with an Ethernet header constructed to be consistent with the configuration for Portals on the port that the NIC is connected to. This is illustrated in FIG. 14.

Within the Linux operating system, it is possible to construct these packets using a raw socket; this is suitable for functional testing since it requires the process to execute as root or with CAP_NET_RAW. The socket can be opened to receive only the specified ether type that a switch is configured to use in the Ethernet header it prepends to the Portals packets. It should be noted that the VNI field of the Portals packet is the protection mechanism, this can be inserted in a privileged domain and for production usage this can be performed in a kernel module.

Figure 15:
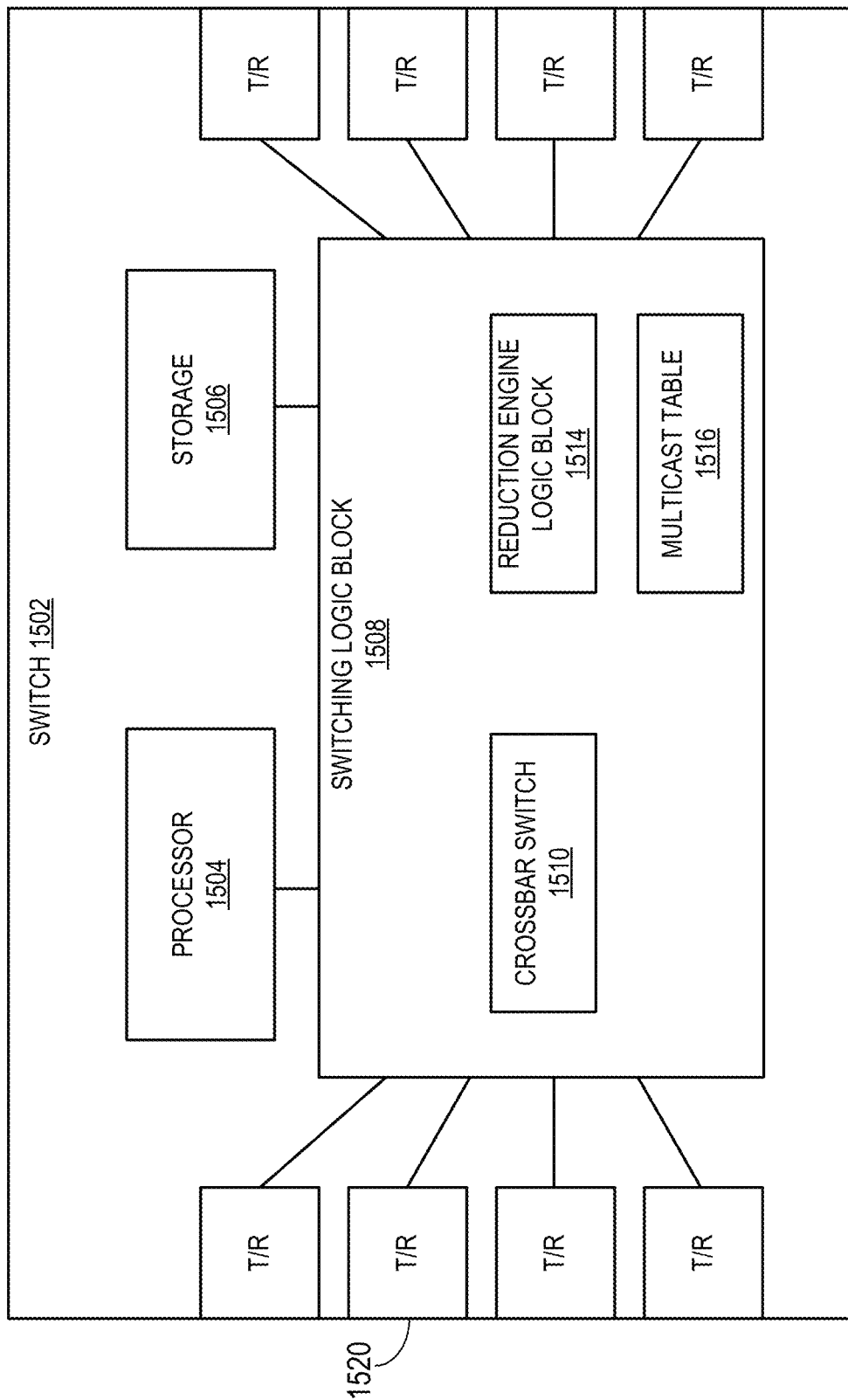
FIG. 15 shows an exemplary switching system that facilitates a reduction engine.

FIG. 15 shows an exemplary switching system that facilitates a reduction engine. In this example, a switch 1502 can include a number of communication ports, such as port 1520. Each port can include a transmitter and a receiver. Switch 1502 can also include a processor 1504, a storage device 1506, and a switching logic block 1508. Switching logic block 1508 can be coupled to all the communication ports and can further include a crossbar switch 1510 and a reduction engine logic block 1514.

Crossbar switch 1510 can include one or more crossbar switch chips, which can be configured to forward data packets and control packets among the communication ports. Reduction engine logic block 1514 can be configured to perform various dynamic reduction functions as described above. Also included in switching logic block 1508 is a multicast table 1516, which can store the reduction tree topology and state information to facilitate the reduction operations performed by reduction engine logic block 1514. Other types of data structure can also be used to store the topology and state information.

In summary, the present disclosure describes a switch capable of on-the-fly reduction in a network. The switch is equipped with a reduction engine that can be dynamically configured to perform on-the-fly reduction. As a result, the network can facilitate an efficient and scalable environment for high performance computing.

The methods and processes described above can be performed by hardware logic blocks, modules, logic blocks, or apparatus. The hardware logic blocks, modules, logic blocks, or apparatus can include, but are not limited to, application-specific integrated circuit (ASIC) chips, field-programmable gate arrays (FPGAs), dedicated or shared processors that execute a piece of code at a particular time, and other programmable-logic devices now known or later developed. When the hardware logic blocks, modules, or apparatus are activated, they perform the methods and processes included within them.

The methods and processes described herein can also be embodied as code or data, which can be stored in a storage device or computer-readable storage medium. When a processor reads and executes the stored code or data, the processor can perform these methods and processes.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A switch, comprising:
    a plurality of ports;
    a processing resource;
    a non-transitory machine-readable medium storing instructions that when executed by the processing resource cause the switch to:
        store, in an entry associated with a reduction operation in a data structure of the switch, topological information identifying one or more child switches and a parent switch participating in the reduction operation and coupled to the switch in a network;
        receive, from a root switch of the reduction operation, a multicast message destined to a multicast address of a multicast group allocated for the reduction operation, the multicast group comprising the root switch, the switch, the parent switch, and the one or more child switches, and the multicast group formed based on a multicast protocol;
        determine, in the multicast message, an instruction from the root switch to initiate the reduction operation;
        initiate the reduction operation based on the instruction in the multicast message;
        send the instruction to initiate the reduction operation to the one or more child switches based on the multicast address;
        perform the reduction operation based on one or more reduction contributions from the one or more child switches, a respective reduction contribution being generated at a corresponding child switch indicated in the entry; and
        generate a reduction frame comprising an output of the reduction operation for the parent switch indicated in the entry; and
    a port of the plurality of ports to send the reduction frame to the parent switch.

2. The switch of claim 1, wherein the entry of the data structure indicates a respective child switch coupled to the switch in a multicast tree of the multicast group, and wherein the entry further comprises a wait time for receiving the reduction contributions from the one or more child switches.

3. The switch of claim 1, wherein the instructions that when executed by the processing resource cause the switch to:
    determine, based on one or more received reduction frames, a total number of reduction contributions performed by switches that are downstream to the switch for the reduction operation.

4. The switch of claim 1, wherein the output in the reduction frame indicates an aggregated count of reduction contributions from the one or more child switches.

5. The switch of claim 1, wherein the reduction operation initiated by the instruction from the root switch comprises one or more of:
    a BARRIER operation;
    a bitwise AND operation;
    a bitwise OR operation;

a bitwise XOR operation;
a MINIMUM operation;
a MAXIMUM operation;
a MINIMUM/MAXIMUM with indexes operation; and
a SUM operation.

6. The switch of claim 1, wherein a header of the reduction frame comprises a cookie uniquely identifying the reduction operation.

7. The switch of claim 1, wherein the reduction frame comprises a virtual network identifier (VNI) value used as a protection key for the reduction operation, and wherein a respective frame associated with the reduction operation includes the same protection key.

8. A method, comprising:
storing, in an entry associated with a reduction operation in a data structure in a storage medium of a switch, topological information identifying one or more child switches and a parent switch participating in the reduction operation and coupled to the switch in a network;
receiving, from a root switch of the reduction operation, a multicast message destined to a multicast address of a multicast group allocated for the reduction operation, the multicast group comprising the root switch, the switch, the parent switch, and the one or more child switches, and the multicast group formed based on a multicast protocol;
determining, in the multicast message, an instruction to initiate the reduction operation;
initiating the reduction operation based on the instruction in the multicast message;
sending the instruction to initiate the reduction operation to the one or more child switches based on the multicast address;
performing the reduction operation based on one or more reduction contributions from the one or more child switches, a respective reduction contribution being generated at a corresponding child switch indicated in the entry;
generating a reduction frame comprising an output of the reduction operation for the parent-switch indicated in the entry; and
sending the reduction frame to the parent switch via a port of the switch.

9. The method of claim 8, wherein the entry in the data structure indicates a respective child switch coupled to the switch in a multicast tree of the multicast group, and wherein the entry further comprises a wait time for receiving the reduction contributions from the one or more child switches.

10. The method of claim 8, further comprising:
determining, based on one or more received reduction frames, a total number of reduction contributions performed by switches that are downstream to the switch for the reduction operation.

11. The method of claim 8, wherein the output in the reduction frame indicates an aggregated count of reduction contributions from the one or more child switches.

12. The method of claim 8, wherein the reduction operation initiated by the instruction from the root switch comprises one or more of:
a BARRIER operation;
a bitwise AND operation;
a bitwise OR operation;
a bitwise XOR operation;
a MINIMUM operation;
a MAXIMUM operation;
a MINIMUM/MAXIMUM with indexes operation; and
a SUM operation.

13. The method of claim 8, wherein a header of the reduction frame comprises a cookie uniquely identifying the reduction operation.

14. The method of claim 8, wherein the reduction frame comprises a virtual network identifier (VNI) value used as a protection key for the reduction operation, and wherein a respective frame associated with the reduction operation includes the same protection key.

15. A computer system, comprising:
a plurality of ports;
a storage medium to store, in an entry associated with a reduction operation in a data structure, topological information identifying one or more child switches and a parent switch participating in the reduction operation and coupled to the computer system in a network; and
a non-transitory computer-readable storage medium storing with instructions to:
receive, from a root switch of the reduction operation, a multicast message destined to a multicast address of a multicast group allocated for the reduction operation, the multicast group comprising the root switch, the computer system, the parent switch, and the one or more child switches, and the multicast group formed based on a multicast protocol;
determine, in the multicast message, an instruction from the root switch to initiate the reduction operation;
initiate the reduction operation based on the instruction in the multicast message;
send the instruction to initiate the reduction operation to the one or more child switches based on the multicast address;
perform the reduction operation based on one or more reduction contributions from the one or more child switches, a respective reduction contribution being generated at a corresponding child switch indicated in the entry; and
generate a reduction frame comprising an output of the reduction operation for the parent switch indicated in the entry; and
wherein a port of the plurality of ports is to send the reduction frame to the parent switch.

16. The computer system of claim 15, wherein the entry in the data structure indicates a respective child switch coupled to the computer system in a multicast tree of the multicast group, and wherein the entry further comprises a wait time for receiving the reduction contributions from the one or more child switches.

17. The computer system of claim 15, wherein the instructions are further to:
determine, based on one or more received reduction frames, a total number of reduction contributions performed by switches that are downstream to the computer system for the reduction operation.

18. The computer system of claim 15, wherein the output in the reduction frame indicates an aggregated count of reduction contributions from the one or more child switches.

19. The computer system of claim 15, wherein the reduction operation initiated by the instruction from the root switch comprises one or more of:
a BARRIER operation;
a bitwise AND operation;
a bitwise OR operation;
a bitwise XOR operation;
a MINIMUM operation;
a MAXIMUM operation;

a MINIMUM/MAXIMUM with indexes operation; and
a SUM operation.

20. The computer system of claim 15, wherein a header of the reduction frame comprises a cookie uniquely identifying the reduction operation.

21. The computer system of claim 15, wherein the reduction frame comprises a virtual network identifier (VNI) value used as a protection key for the reduction operation, and wherein a respective frame associated with the reduction operation includes the same protection key.

* * * * *